US012663681B2

(12) United States Patent
Kang et al.

(10) Patent No.: US 12,663,681 B2
(45) Date of Patent: Jun. 23, 2026

(54) DISPLAY PANEL AND METHOD OF FABRICATING THE SAME

(71) Applicant: HannStar Display Corporation, Taipei City (TW)

(72) Inventors: Mu-Kai Kang, Taipei City (TW);
Cheng-Yen Yeh, Taipei City (TW);
Yen-Chung Chen, Taipei City (TW);
Jing-Xuan Chen, Taipei City (TW);
Qi-En Luo, Taipei City (TW);
Shao-Chien Chang, Taipei City (TW)

(73) Assignee: HannStar Display Corporation, Taipei City (TW)

( * ) Notice: Subject to any disclaimer, the term of this patent is extended or adjusted under 35 U.S.C. 154(b) by 144 days.

(21) Appl. No.: 18/746,029

(22) Filed: Jun. 17, 2024

(65) Prior Publication Data

US 2025/0068019 A1 Feb. 27, 2025

(30) Foreign Application Priority Data

Aug. 22, 2023 (TW) ................................. 112131435

(51) Int. Cl.
*G02F 1/1362* (2006.01)
*G02F 1/1368* (2006.01)

(52) U.S. Cl.
CPC .. *G02F 1/136213* (2013.01); *G02F 1/136286* (2013.01); *G02F 1/1368* (2013.01)

(58) Field of Classification Search
CPC ......... G02F 1/136213; G02F 1/136286; G02F 1/1368; G02F 1/133555
See application file for complete search history.

(56) References Cited

U.S. PATENT DOCUMENTS

| | | | | |
|---|---|---|---|---|
| 8,547,509 B2 * | 10/2013 | Moon | ............... | G02F 1/136227 |
| | | | | 349/114 |
| 2009/0059110 A1 * | 3/2009 | Sasaki | ............... | G02F 1/136213 |
| | | | | 349/114 |
| 2017/0343873 A1 * | 11/2017 | Ma | .................... | G02F 1/136213 |

FOREIGN PATENT DOCUMENTS

| | | |
|---|---|---|
| TW | 201411584 | 3/2014 |
| TW | 201740164 | 11/2017 |

* cited by examiner

*Primary Examiner* — Jennifer D. Carruth
*Assistant Examiner* — Agnes Dobrowolski
(74) *Attorney, Agent, or Firm* — JCIPRNET

(57) ABSTRACT

A display panel includes a substrate, multiple scan lines, multiple data lines, and multiple pixel structures. The scan lines and the data lines are disposed on the substrate. The pixel structure is disposed on the substrate and electrically connected to the scan lines and the data lines, and includes an active device, a pixel electrode, a capacitor electrode, an overcoat layer, a first common electrode, a second common electrode, a first passivation layer, and a second passivation layer. The active device is electrically connected one scan line, one data line, and the pixel electrode. The capacitor electrode extends from a drain and is electrically connected to the pixel electrode. The overcoat layer is disposed between the pixel electrode and the capacitor electrode. The first common electrode overlaps the capacitor electrode, and is located between the overcoat layer and the capacitor electrode. The second common electrode overlaps the pixel electrode, and is located between the overcoat layer and the pixel electrode. The first passivation layer is disposed between the capacitor electrode and the first common electrode. The second passivation layer is disposed between the second common electrode and the pixel electrode.

12 Claims, 21 Drawing Sheets

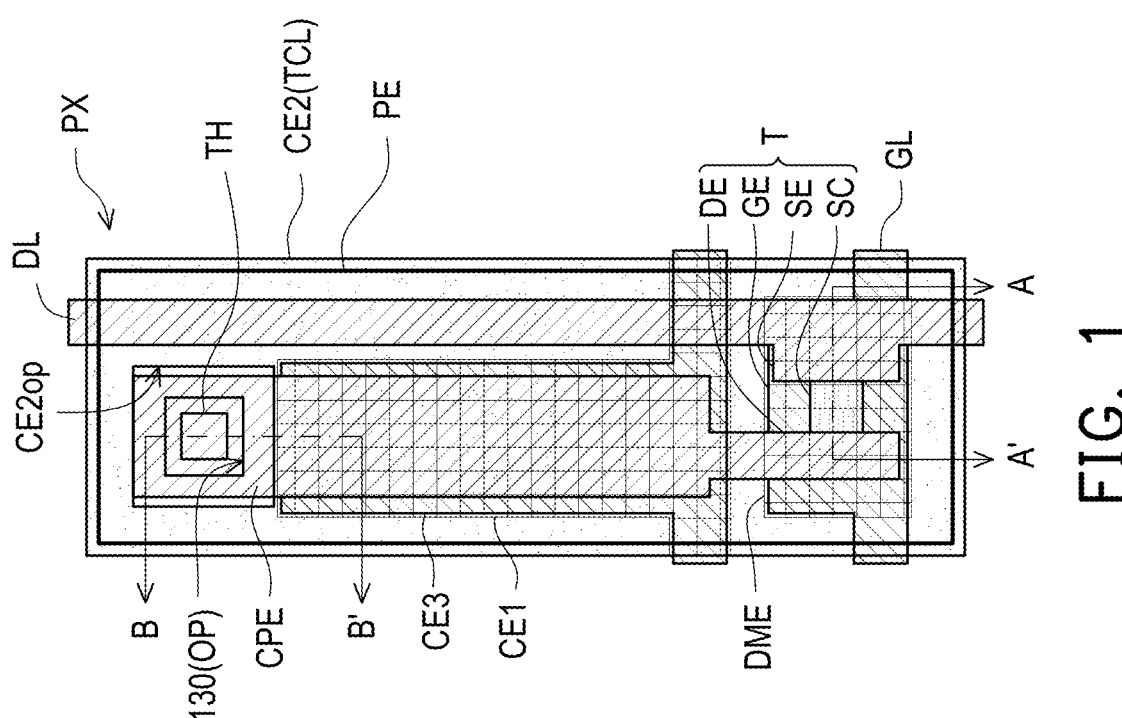
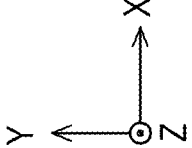
FIG. 1

121M
110
CE3
101

B'

CPE

ML2 { DL, CPE, SE, DE

DISPLAY PANEL AND METHOD OF FABRICATING THE SAME

CROSS-REFERENCE TO RELATED APPLICATION

This application claims the priority benefit of Taiwan application serial no. 112131435, filed on Aug. 22, 2023. The entirety of the above-mentioned patent application is hereby incorporated by reference herein and made a part of this specification.

BACKGROUND

Technical Field

The disclosure relates to a display panel and a method of fabricating the same, and more particularly, to a display panel with a storage capacitor and a method of fabricating the same.

Description of Related Art

A pixel structure is the smallest driving unit used by a display panel to present an image. In order to maintain a driving signal of the pixel structure at a certain level within a predetermined time interval, most of the pixel structures are equipped with a storage capacitor. In order to achieve better display quality, a size of the pixel structure is continuously reduced, which also compresses a layout space of the storage capacitor. Therefore, how to increase the storage capacitor in a limited space without affecting operating electrical properties of other elements is a technical issue that is required to be overcome for panel manufacturers.

SUMMARY

The disclosure relates to a display panel, which has better display quality when driven at a low frequency.

The disclosure relates to a method of fabricating a display panel, in which process integration of multiple storage capacitors is relatively high.

According to an embodiment of the disclosure, a display panel includes a substrate, multiple scan lines, multiple data lines, and multiple pixel structures. The scan lines and the data lines are disposed on the substrate and intersect with each other. The pixel structures are disposed on the substrate, and is electrically connected to the scan lines and the data lines. Each of the pixel structures includes an active device, a pixel electrode, a capacitor electrode, an overcoat layer, a first common electrode, a second common electrode, a first passivation layer, and a second passivation layer. The active device has a gate, a source, and a drain. The gate is electrically connected to one of the scan lines. The source is electrically connected to one of the data lines. The pixel electrode is electrically connected to the drain of the active device. The capacitor electrode extends from the drain, and is electrically connected to the pixel electrode. The overcoat layer is disposed between the pixel electrode and the capacitor electrode. The first common electrode overlaps the capacitor electrode, and is located between the overcoat layer and the capacitor electrode. The second common electrode overlaps the pixel electrode, and is located between the overcoat layer and the pixel electrode. The first passivation layer is disposed between the capacitor electrode and the first common electrode. The second passivation layer is disposed between the second common electrode and the pixel electrode.

In the display panel according to the embodiment of the disclosure, the first common electrode is electrically coupled to the capacitor electrode to form a first storage capacitor, and the second common electrode is electrically coupled to the pixel electrode to form a second storage capacitor.

In the display panel according to the embodiment of the disclosure, an overlapping area of the second common electrode and the pixel electrode is greater than an overlapping area of the first common electrode and the capacitor electrode.

In the display panel according to the embodiment of the disclosure, a capacitance value of the second storage capacitor is greater than a capacitance value of the first storage capacitor.

In the display panel according to the embodiment of the disclosure, each of the pixel structures further includes a third common electrode overlapping the capacitor electrode and located between the capacitor electrode and the substrate, and the third common electrode is electrically coupled to the capacitor electrode to form a third storage capacitor.

In the display panel according to the embodiment of the disclosure, the display panel has a reflection area. The pixel electrode is located in the reflection area. A material of the pixel electrode includes metal.

In the display panel according to the embodiment of the disclosure, the display panel has a reflection area and a transmission area. The pixel electrode is located in the reflection area and the transmission area, and a material of the pixel electrode includes a transparent conductive material. Each of the pixel structures further includes a reflection layer electrically connected to the pixel electrode. The reflection layer is located in the reflection area. The reflection layer overlaps and covers a portion of the pixel electrode, and a portion of the pixel electrode not covered by the reflection layer is located in the transmission area.

According to an embodiment of the disclosure, a method of fabricating a display panel includes the following. A metal layer is formed on a substrate. A first passivation material layer is formed on the metal layer. Another metal layer is formed on the first passivation material layer. An overcoat layer is formed on the first passivation material layer and the another metal layer. A transparent conductive layer is formed on the overcoat layer. A second passivation material layer is formed on the transparent conductive layer. An etching process is performed on the first passivation material layer and the second passivation material layer to generate a first passivation layer and a second passivation layer exposing a portion of the capacitor electrode. A pixel electrode is formed on the second passivation layer. The metal layer includes a capacitor electrode. The another metal layer includes a first common electrode, and the first common electrode overlaps the capacitor electrode. The overcoat layer has an opening overlapping the capacitor electrode. The transparent conductive layer includes a second common electrode. The second passivation material layer extends into the opening and covers the first passivation material layer. The pixel electrode extends into the opening of the overcoat layer to be electrically connected to the capacitor electrode, and the pixel electrode overlaps the second common electrode.

In the method of fabricating the display panel according to the embodiment of the disclosure, the metal layer is a second metal layer, and the another metal layer is a third metal layer. Before the second metal layer is formed, the method further includes the following. A first metal layer is formed on the substrate, and an insulation layer is formed on the first metal layer. The first metal layer includes a third common electrode. After the second metal layer is formed, the second metal layer is located on the insulation layer.

In the method of fabricating the display panel according to the embodiment of the disclosure, a material of the overcoat layer includes a photosensitive material, and a step of forming the overcoat layer includes the following. An overcoat material layer is formed on the first passivation layer and the another metal layer. An exposure process and a development process are performed on the overcoat material layer to remove a portion of the overcoat material layer to form the opening.

In the method of fabricating the display panel according to the embodiment of the disclosure, the first passivation material layer and the second passivation material layer are etched in a same photolithography etching process.

In the method of fabricating the display panel according to the embodiment of the disclosure, the method of fabricating the display panel further includes the following. A reflection layer is formed on the pixel electrode. The reflection layer is electrically connected to the pixel electrode.

Based on the above, in the display panel and the method of fabricating the same according to an embodiment of the disclosure, one common electrode is disposed between the capacitor electrode electrically connected to the active device and the overcoat layer, and another common electrode is disposed between the pixel electrode electrically connected to the capacitor electrode and the overcoat layer. Since the side of the overcoat layer closer to the pixel electrode is also provided with the common electrode, in addition to shortening the distance between the pixel electrode and the common electrode, the overlapping range of the common electrode and the pixel electrode may also be larger, thereby increasing the storage capacitor capacity of the pixel structure.

BRIEF DESCRIPTION OF THE DRAWINGS

FIG. 1 is a schematic top view of a display panel according to the first embodiment of the disclosure.

FIGS. 3A to 3I are cross-sectional views of a flow of a method of fabricating the display panel in FIG. 2.

DETAILED DESCRIPTION OF DISCLOSED EMBODIMENTS

Figure 2:
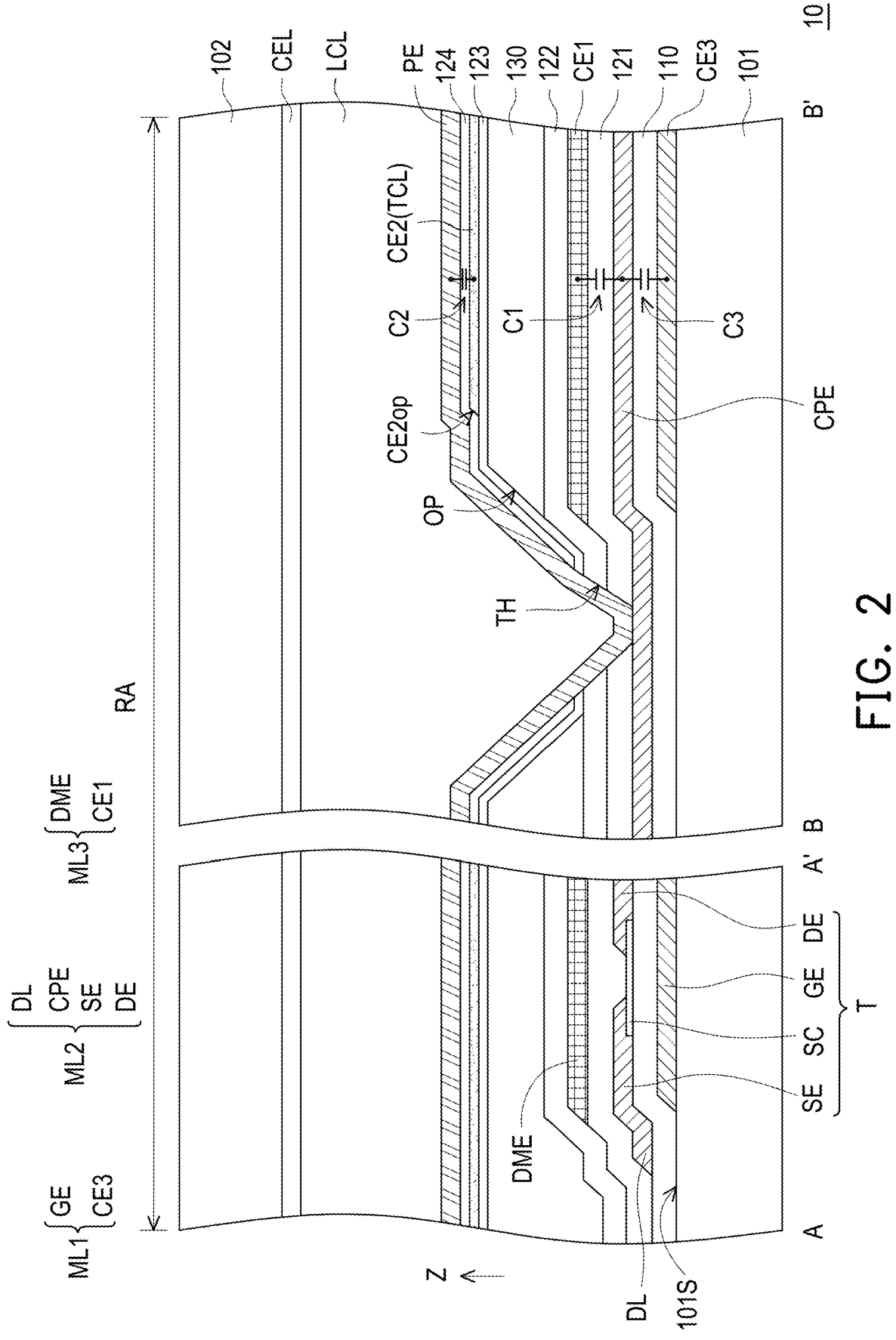
FIG. 2 is a schematic cross-sectional view of the display panel in FIG. 1.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts.

FIG. 1 is a schematic top view of a display panel according to the first embodiment of the disclosure. FIG. 2 is a schematic cross-sectional view of the display panel in FIG. 1. FIGS. 3A to 3I are cross-sectional views of a flow of a method of fabricating the display panel in FIG. 2. FIGS. 4A to 4H are schematic top views of each of film layers of the display panel in FIG. 1. FIGS. 5A to 5C are schematic top views of some of the film layers of the display panel in FIG. 1. FIG. 2 corresponds to a section line A-A' and a section line B-B' in FIG. 1. For the sake of clarity, in FIG. 1, a substrate 101, a substrate 102, a common electrode layer CEL, and a liquid crystal layer LCL in FIG. 2 are omitted.

Referring to FIGS. 1 and 2, a display panel 10 includes the substrate 101, the substrate 102, and the liquid crystal layer LCL. The liquid crystal layer LCL is disposed between the substrate 101 and the substrate 102. That is to say, the display panel 10 in this embodiment is a liquid crystal display panel, but the disclosure is not limited thereto.

The display panel 10 further includes multiple scan lines GL, multiple data lines DL, and multiple pixel structures PX disposed on the substrate 101. The pixel structure PX is electrically connected to one of the scan lines GL and one of the data lines DL. It should be noted that in FIG. 1, only one display unit of the display panel 10 is shown, and the display panel 10 may be formed by arranging multiple display units. For example, the data lines DL may be arranged along a direction X, and each of the data lines DL extends in a direction Y. The scan lines GL may be arranged along the direction Y, and each of the scan line GL extends on the direction X. The direction X is optionally perpendicular to the direction Y. The pixel structures PX may be arranged in multiple rows and columns along the direction X and the direction Y respectively.

The pixel structure PX includes an active device T, a capacitor electrode CPE, a first common electrode CE1, a second common electrode CE2, a third common electrode CE3, and a pixel electrode PE. The active device T has a source SE, a drain DE, a gate GE, and a semiconductor pattern SC. The source SE is electrically connected to one of the corresponding data lines DL. The drain DE is electrically connected to the capacitor electrode CPE. The gate GE is electrically connected to one of the corresponding scan lines GL. More specifically, an extended portion of the scan line GL corresponding to the pixel structure PX may be used as the gate GE of the active device T, and an extended portion of the data line DL corresponding to the pixel structure PX may be used as the source SE of the active device T. The capacitor electrode CPE extends from the drain DE and is electrically connected to the pixel electrode PE.

The first common electrode CE1 is disposed between the capacitor electrode CPE and the pixel electrode PE in a direction Z, and overlaps the capacitor electrode CPE and the pixel electrode PE along the direction Z. The second common electrode CE2 is disposed between the first common electrode CE1 and the pixel electrode PE in the direction Z, and overlaps the pixel electrode PE and the first common electrode CE1 along the direction Z. The third common electrode CE3 is disposed between the capacitor electrode CPE and the substrate 101 in the direction Z, and overlaps the capacitor electrode CPE along the direction Z. In this embodiment, the pixel structure PX is disposed on a surface 101S of the substrate 101, and the direction Z is a direction perpendicular to the surface 101S of the substrate 101.

In this embodiment, the pixel structure PX optionally further includes an insulation layer 110, a passivation layer 121, a passivation layer 122, a passivation layer 123, a passivation layer 124, and an overcoat layer 130. As shown in FIG. 2, the insulation layer 110 is disposed between the third common electrode CE3 and the capacitor electrode CPE in the direction Z. The passivation layer 121 (i.e., a first passivation layer) is disposed between the capacitor electrode CPE and the first common electrode CE1 in the direction Z. The passivation layer 122 is disposed between the overcoat layer 130 and the first common electrode CE1 in the direction Z. The passivation layer 123 is disposed between the overcoat layer 130 and the second common electrode CE2 in the direction Z. The passivation layer 124 (i.e., a second passivation layer) is disposed between the second common electrode CE2 and the pixel electrode PE in the direction Z. The overcoat layer 130 is disposed between the second common electrode CE2 and the first common electrode CE1. Specifically, as shown in FIG. 2, the third common electrode CE3, the insulation layer 110, the capacitor electrode CPE, the passivation layer 121, the first common electrode CE1, the passivation layer 122, the overcoat layer 130, the passivation layer 123, the second common electrode CE2, the passivation layer 124, and the pixel electrode PE are arranged sequentially along the direction Z.

For example, the first common electrode CE1 may be electrically coupled to the capacitor electrode CPE to form a first storage capacitor C1 (that is, the first storage capacitor C1 is formed by the first common electrode CE1, the capacitor electrode CPE, and an insulation film layer located between the above two electrodes). The second common electrode CE2 may be electrically coupled to the pixel electrode PE to form a second storage capacitor C2 (that is, the second storage capacitor C2 is formed by the pixel electrode PE, the second common electrode CE2, and an insulation film layer located between the above two electrodes). The third common electrode CE3 may be electrically coupled to the capacitor electrode CPE to form a third storage capacitor C3 (that is, the third storage capacitor C3 is formed by the third common electrode CE3, the capacitor electrode CPE, and an insulation film layer located between the above two electrodes).

More specifically, a storage capacitor of the pixel structure PX may be formed by the first storage capacitor C1, the second storage capacitor C2, and the third storage capacitor C3 connected in parallel. In this embodiment, the first storage capacitor C1 is formed by the first common electrode CE1, the capacitor electrode CPE and the passivation layer 121 located between the first common electrode CE1 and the capacitor electrode CPE. The second storage capacitor C2 is formed by the pixel electrode PE, the second common electrode CE2, and the passivation layer 124 located between the pixel electrode PE and the second common electrode CE2. The third storage capacitor C3 is formed by the third common electrode CE3, the capacitor electrode CPE, and the insulation layer 110 located between the third common electrode CE3 and the capacitor electrode CPE.

It should be noted that in addition to the first common electrode CE1 disposed between the overcoat layer 130 and the capacitor electrode CPE, the second common electrode CE2 is further disposed between the overcoat layer 130 and the pixel electrode PE. Accordingly, in addition to shortening a distance between the pixel electrode PE and the common electrode, an overlapping area of the common electrode and the pixel electrode PE may also be larger. Therefore, a capacitance value of the second storage capacitor C2 formed by the pixel electrode PE and the second common electrode CE2 may be greater. For example, in this embodiment, the capacitance value of the second storage capacitor C2 formed by the pixel electrode PE and the second common electrode CE2 may be greater than a capacitance value of the first storage capacitor C1 formed by the capacitor electrode CPE and the first common electrode CE1 and a capacitance value of the third storage capacitor C3 formed by the capacitor electrode CPE and the third common electrode CE3. That is to say, by disposing another common electrode (such as the second common electrode CE2) on one side of the overcoat layer 130 close to the pixel electrode PE, overall storage capacitor capacity of the pixel structure PX may be greatly increased. For example, in a comparative embodiment of a pixel structure without disposing the second common electrode CE2 and the passivation layer 124, storage capacitance of the pixel structure may be 199.23 femtofarad (fF), while storage capacitance of the pixel structure PX in this embodiment may be 847.45 femtofarad. Therefore, compared to the comparative embodiment, the storage capacitance of the pixel structure PX in this embodiment may be increased by more than four times.

On the other hand, in this embodiment, the second common electrode CE2 overlaps the active device T in the direction Z. In order to reduce the coupling effect between the active device T and the second common electrode CE2, so as to prevent a potential of the second common electrode CE2 from causing the active device T to be turned on and causing leakage, a dummy electrode DME may be further disposed between the active device T and the second common electrode CE2. The dummy electrode DME overlaps the active device T along the direction Z. For example, the dummy electrode DME may have a floating potential, but the disclosure is not limited thereto.

In addition, the display panel 10 may further include the common electrode layer CEL disposed on a surface of the substrate 102 facing the liquid crystal layer LCL. That is, the common electrode layer CEL is located between the substrate 102 and the liquid crystal layer LCL. A material of the common electrode layer CEL may include a transparent conductive material, and the transparent conductive material may, for example, include metal oxides (e.g., indium tin oxide, indium zinc oxide, aluminum tin oxide, aluminum zinc oxide, or other suitable oxides, or a stacked layer of at least two of the above), but the disclosure is not limited thereto. For example, an electric field formed between the pixel electrode PE of each of the pixel structures PX and the common layer electrode CEL may control a direction of liquid crystal molecules in the liquid crystal layer LCL to display the corresponding image. In this embodiment, the common electrode layer CEL, the first common electrode CE1, the second common electrode CE2, and the third common electrode CE3 may receive a common voltage, but the disclosure is not limited thereto.

Hereinafter, a method of fabricating the display panel 10 will be exemplarily described.

Figure 4C:
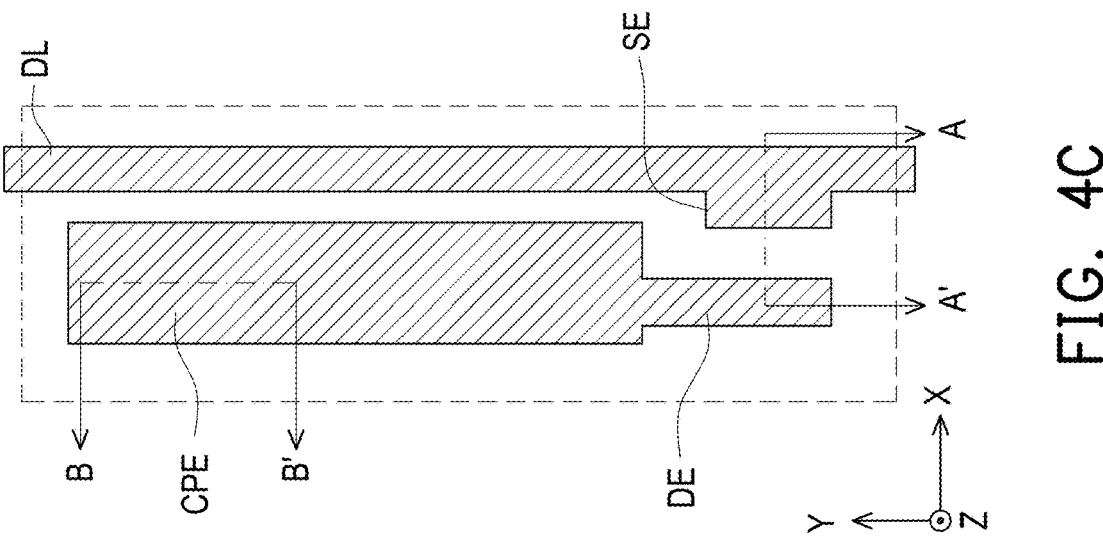
FIGS. 4A to 4H are schematic top views of each of film layers of the display panel in FIG. 1.
Figure 4B:
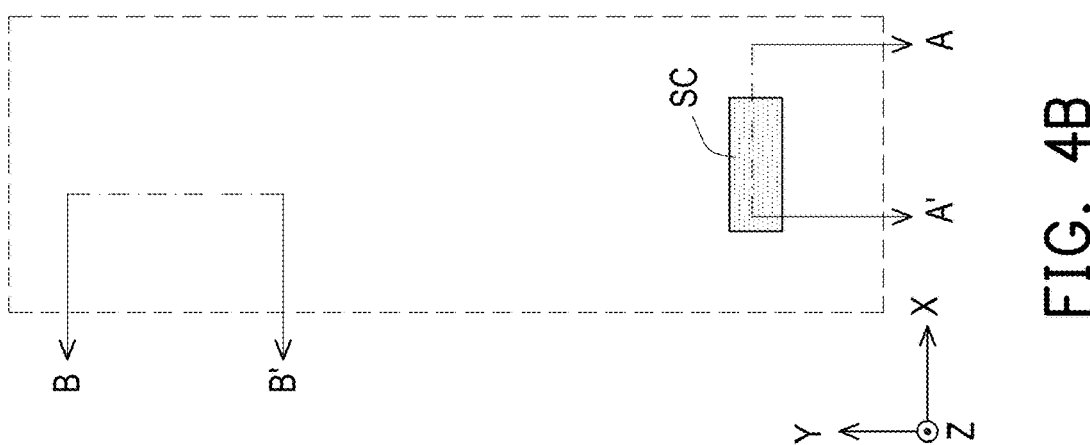
Figure 4A:
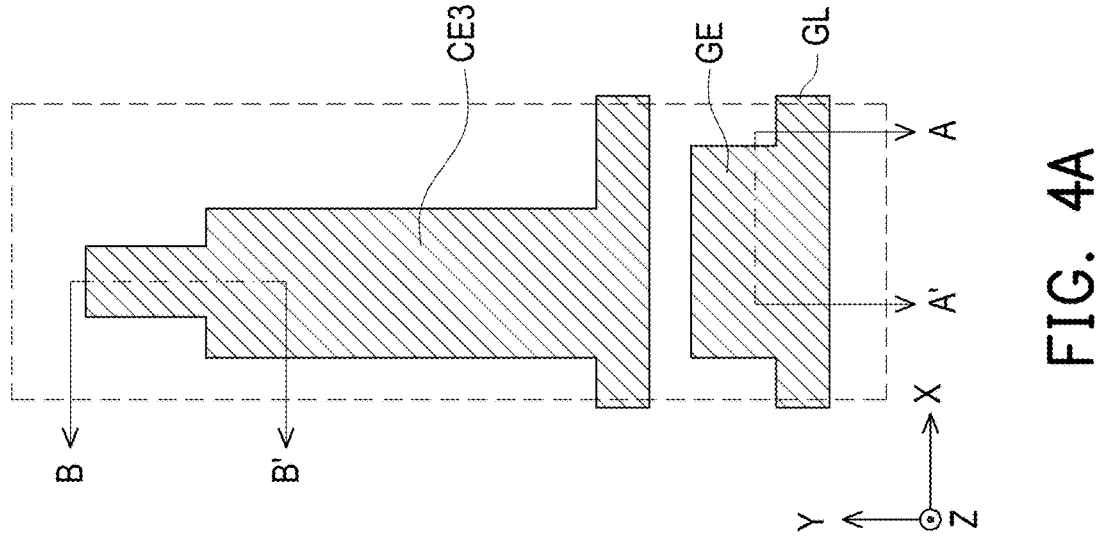
Figure 5C:
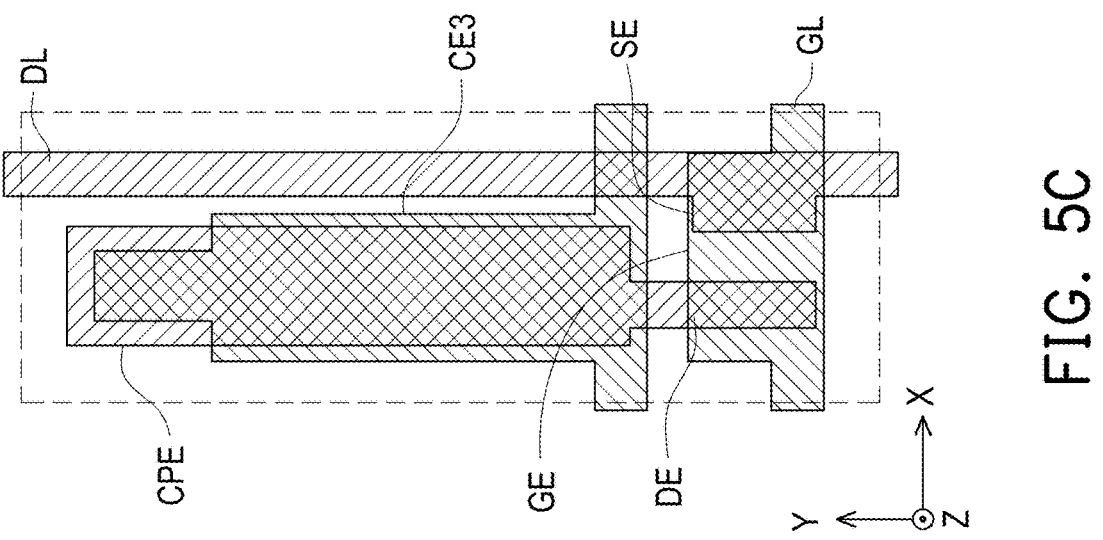
FIGS. 5A to 5C are schematic top views of some of the film layers of the display panel in FIG. 1.
Figure 5B:
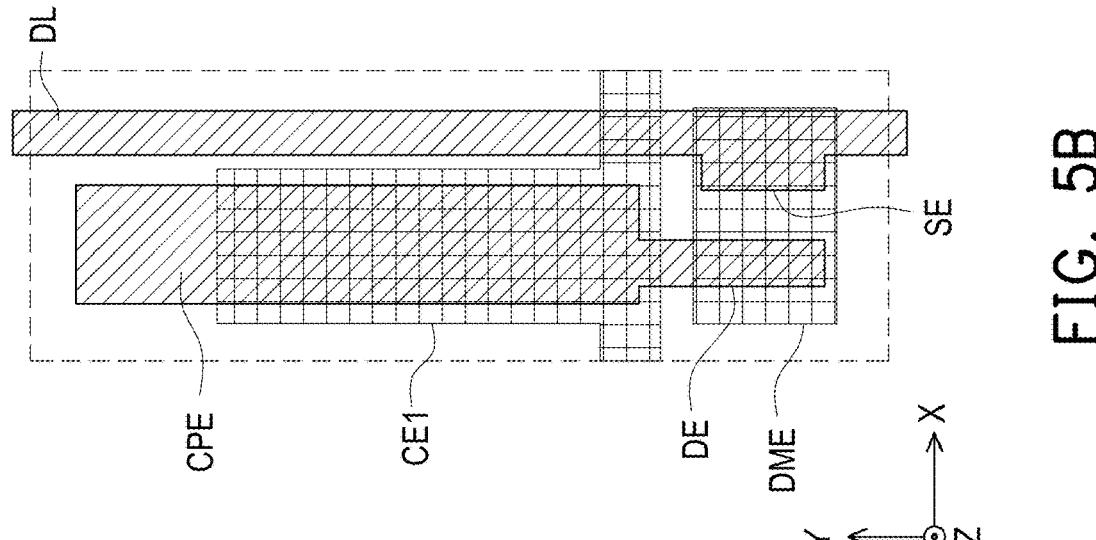
Figure 5A:
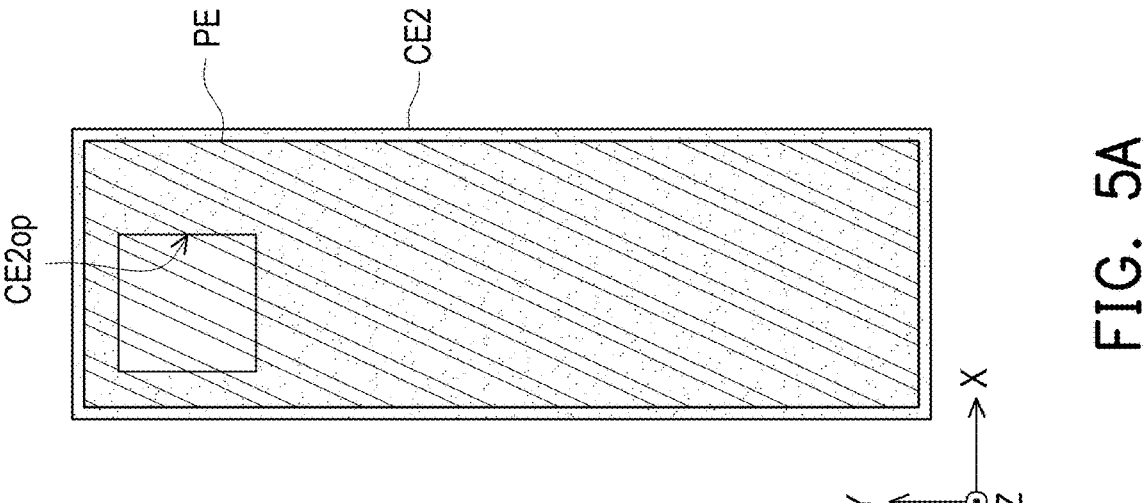

Referring to FIGS. 3A and 4A to 4C, first, a first metal layer ML1 is formed on the substrate 101. FIG. 4A is a top view of the first metal layer ML1. In this embodiment, the first metal layer ML1 includes the scan line GL (as shown in FIG. 1), the gate GE, and the third common electrode CE3. A material of the substrate 101 is, for example, glass, quartz, high molecular polymer, or other suitable plates. A material of the first metal layer ML1 may include metals (such as molybdenum, aluminum, copper, nickel, chromium), alloys, nitrides of metal materials, oxides of the metal materials, oxynitrides of the metal materials, other suitable materials, or a stacked layer of the metal materials and other conductive materials.

The insulation layer 110 is formed on the first metal layer ML1. The insulation layer 110 is, for example, a gate insulation layer, and a material thereof may include silicon oxide, silicon nitride, or other suitable dielectric materials. The semiconductor pattern SC and a second metal layer ML2 are formed on the insulation layer 110. FIG. 4B is a schematic top view of the semiconductor pattern SC, and FIG. 4C is a schematic top view of the second metal layer ML2. In this embodiment, the second metal layer ML2 includes the data line DL (as shown in FIG. 1), the source SE, the drain DE, and the capacitor electrode CPE. The capacitor electrode CPE overlaps the third common electrode CE3 of the first metal layer ML1 in the direction Z.

The semiconductor pattern SC may be used as a channel layer of the active device T, and the source SE and the drain DE are respectively electrically connected to two different regions of the semiconductor pattern SC. Here, the active device T may be formed by the gate GE, the source SE, the drain DE, and the semiconductor pattern SC. A material of the semiconductor pattern SC may include an amorphous silicon semiconductor, a monocrystalline silicon semiconductor, a polycrystalline silicon semiconductor, or a metal oxide semiconductor. In this embodiment, the active device T may be a thin film transistor, such as an amorphous silicon thin film transistor (a-Si TFT), but the disclosure is not limited thereto. In other embodiments, the active device T may also be a polycrystalline silicon TFT (poly-Si TFT) or a metal oxide semiconductor TFT. In some embodiments, an ohmic contact layer is further between the source SE and the semiconductor pattern SC and between the drain DE and the semiconductor pattern SC. A material of the ohmic contact layer may be, for example, a doped amorphous silicon layer, but the disclosure is not limited thereto.

In this embodiment, the gate GE is optionally disposed below the semiconductor pattern SC to form a bottom-gate thin-film-transistor, but the disclosure is not limited thereto. In other embodiments, the gate GE may also be disposed above the semiconductor pattern SC to form a top-gate thin-film-transistor. A material of the second metal layer ML2 may include metals (such as molybdenum, aluminum, copper, nickel, chromium), alloys, nitrides of metal materials, oxides of the metal materials, oxynitrides of the metal materials, other suitable materials, or a stacked layer of the metal materials and other conductive materials.

Next, a passivation material layer 121M (i.e., a first passivation material layer) is formed on the second metal layer ML2, as shown in FIG. 3B. A material of the passivation material layer 121M may include, for example, silicon nitride, silicon oxide, or aluminum oxide, but the disclosure is not limited thereto.

Figure 3A:
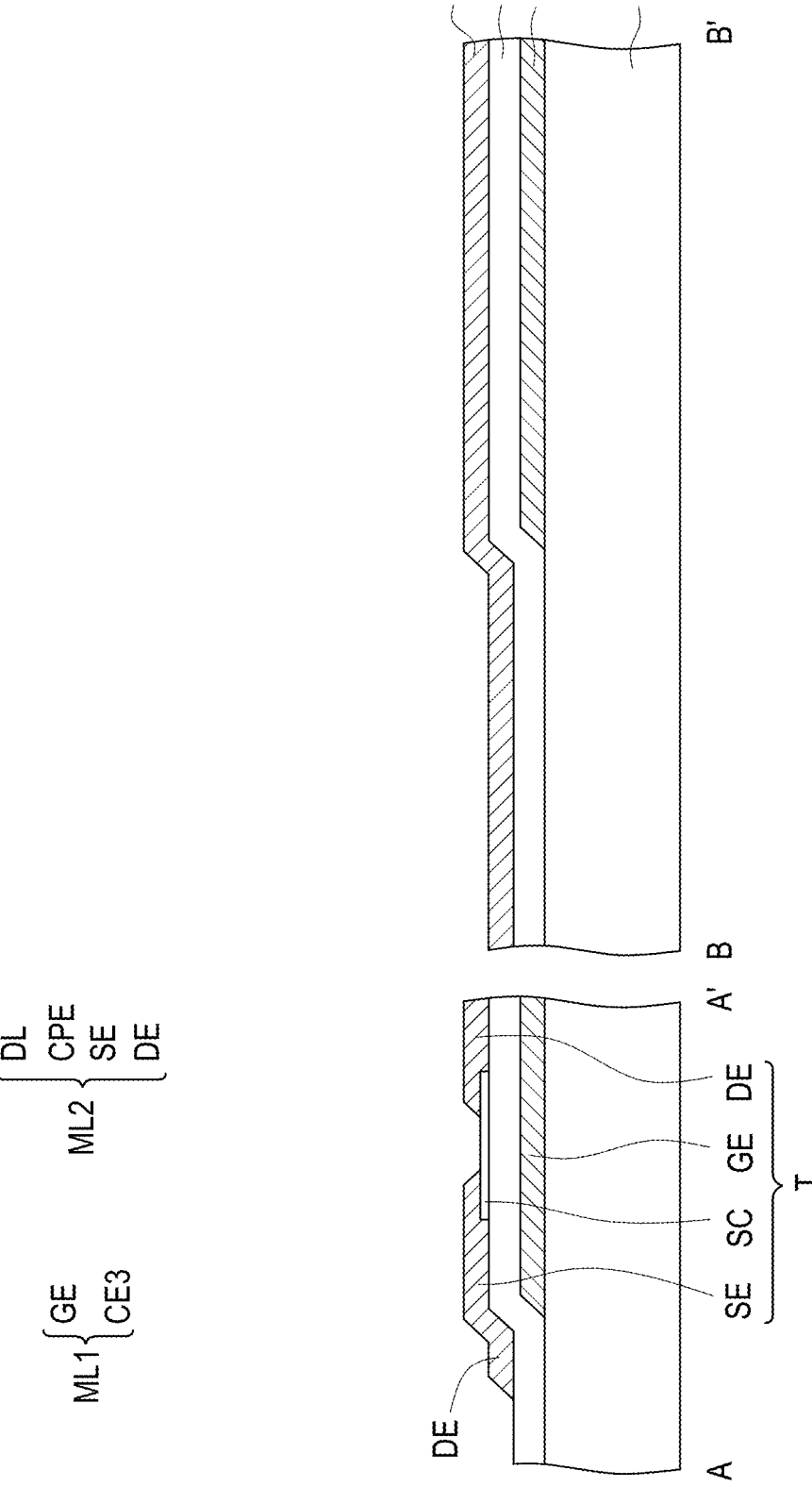
Figure 3B:
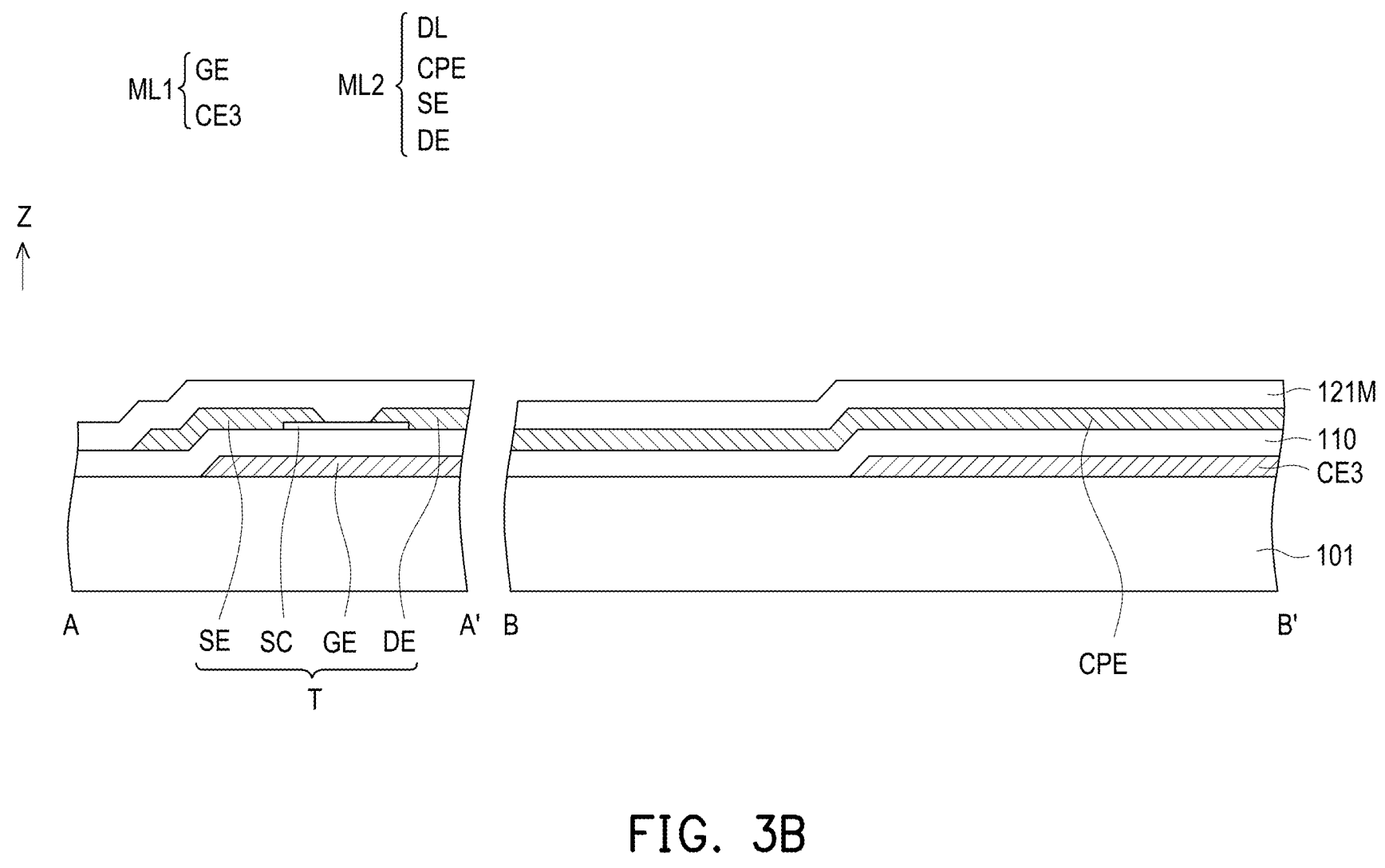
Figure 3C:
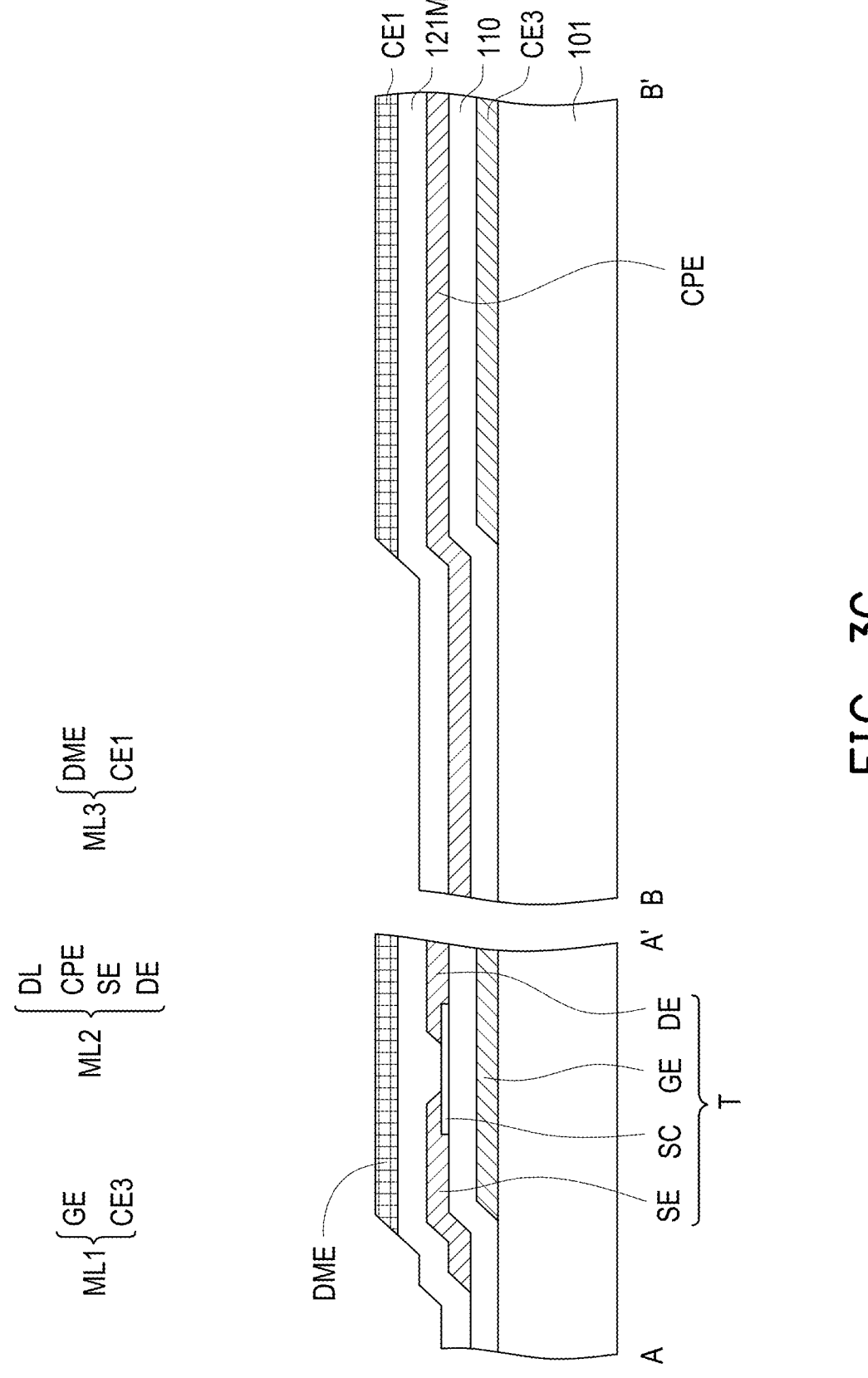
Figures 4D, 4E, 4F:
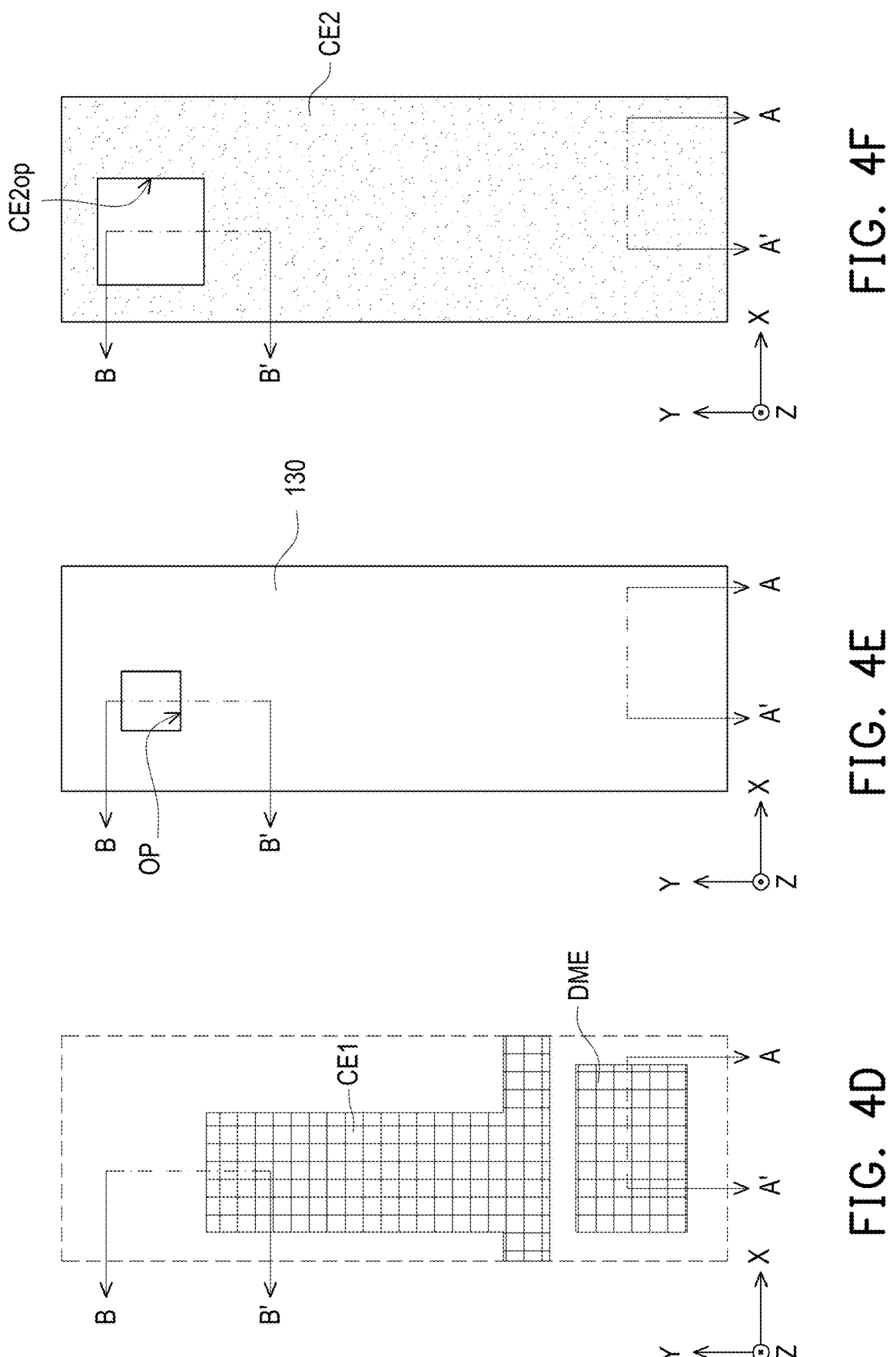

Referring to FIGS. 3C and 4D, a third metal layer ML3 is formed on the passivation material layer 121M. FIG. 4D is a top view of the third metal layer ML3. The third metal layer ML3 may include the first common electrode CE1 and the dummy electrode DME that are structurally separated. Therefore, the first common electrode CE1 and the dummy electrode DME may be electrically insulated from each other. A material of the third metal layer ML3 may include metals (such as molybdenum, aluminum, copper, nickel, chromium), alloys, nitrides of metal materials, oxides of the metal materials, oxynitrides of the metal materials, other suitable materials, or a stacked layer of the metal materials and other conductive materials.

Figure 3D:
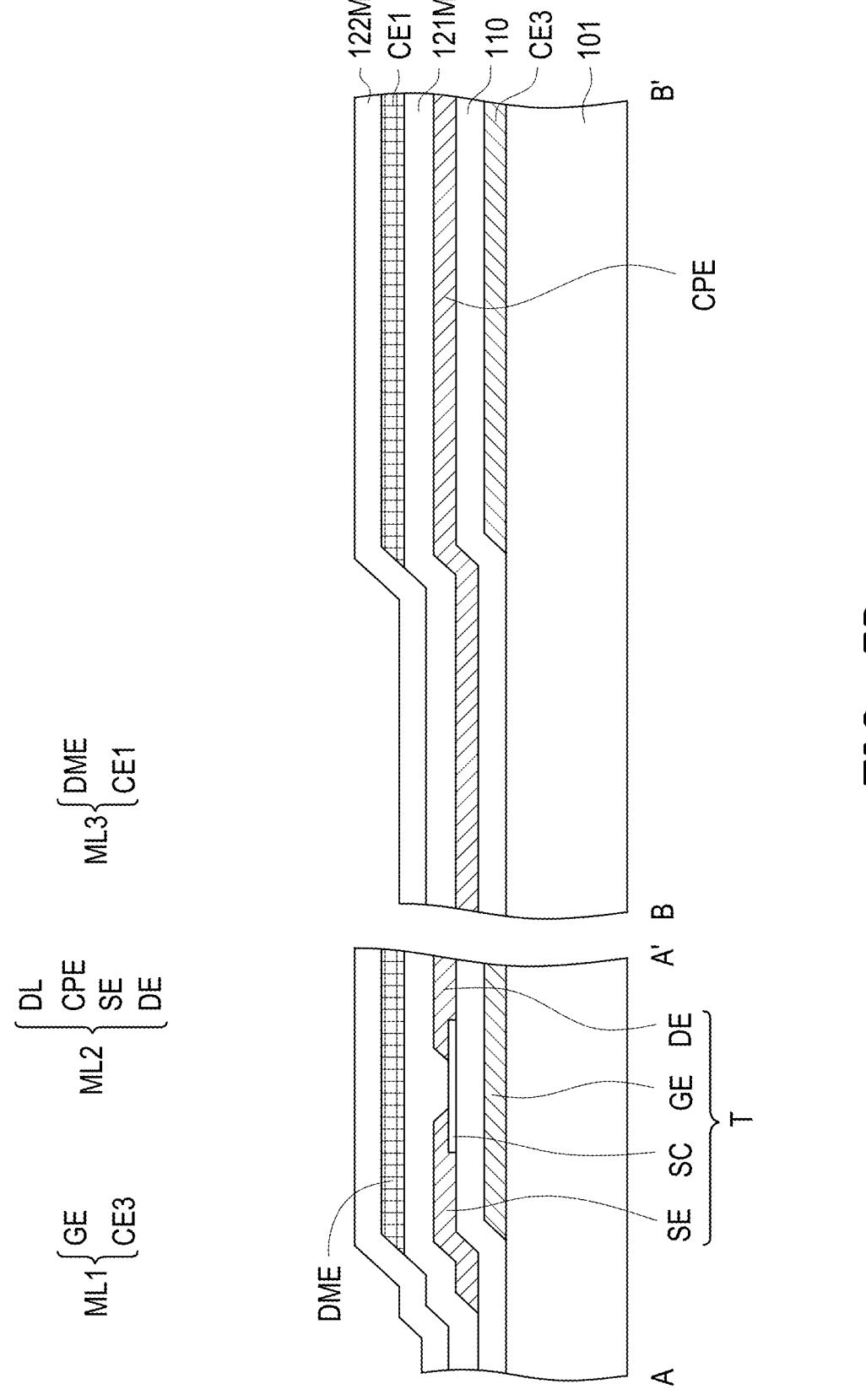
Figure 3E:
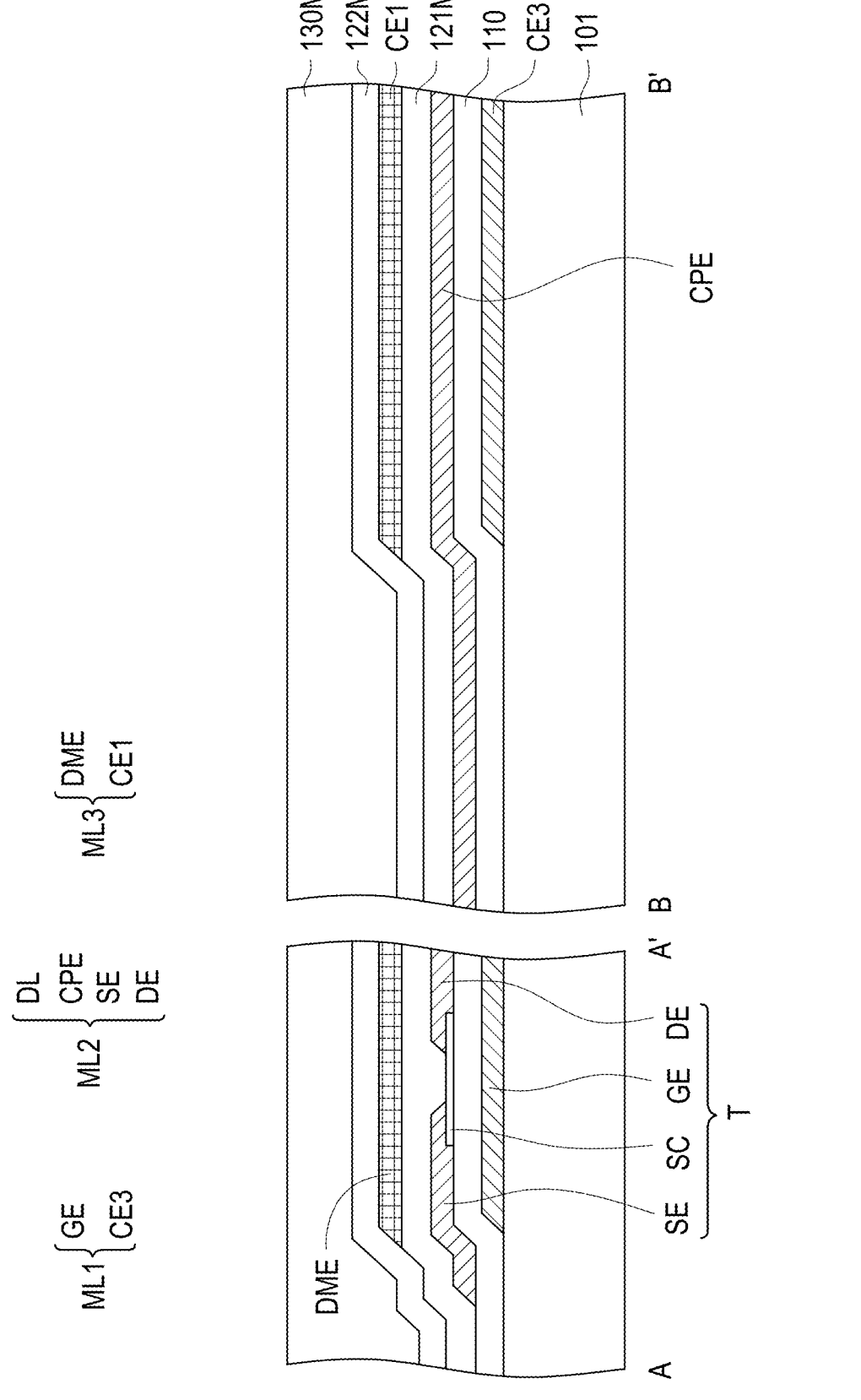
Figure 3F:
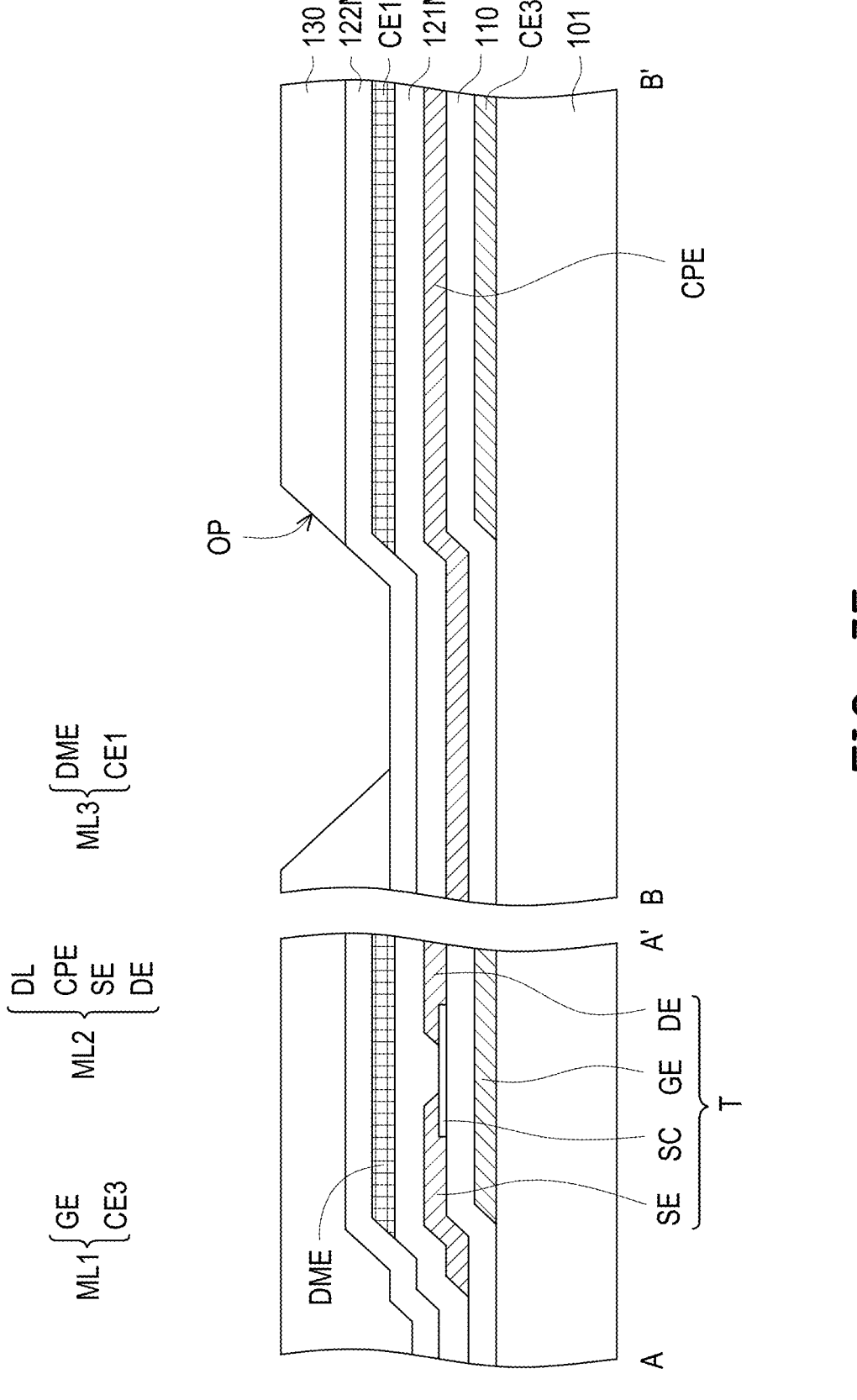

A passivation material layer 122M is formed on the third metal layer ML3, as shown in FIG. 3D. Next, the overcoat layer 130 is formed on the passivation material layer 122M, as shown in FIGS. 3E, 3F, and 4E. FIG. 4E is a schematic top view of an opening OP of the overcoat layer 130. The overcoat layer 130 has the opening OP that overlaps the capacitor electrode CPE, and the opening OP exposes a portion of the passivation material layer 122M. For example, in this embodiment, a material of the overcoat layer 130 may include a photosensitive material (such as a photoresist material), and steps of forming the overcoat layer 130 includes forming an overcoat material layer 130M on the passivation material layer 122M and performing an exposure process and a development process on the overcoat material layer 130M to remove a portion of the overcoat material layer 130M to form the opening OP. In other words, a patterning process of the overcoat material layer 130M may be completed without an etching process, which helps to save the number of process steps.

In this embodiment, the overcoat layer 130 is, for example, an organic insulation layer, and the material thereof may include polyesters, polyolefins, polypropylenes, polycarbonates, polyalkylene oxides, polystyrenes, polyethers, polyketones, polyalcohols, polyaldehydes, other suitable materials, or a combination of the above. The passivation material layer 122M is, for example, an inorganic insulation layer, and a material thereof may include, for example, silicon nitride, silicon oxide, or aluminum oxide, but the disclosure is not limited thereto. Therefore, through the configuration of the passivation material layer 122M, it is possible to avoid an issue of peeling of the overcoat layer 130 due to direct contact with the third metal layer ML3.

Figure 3G:
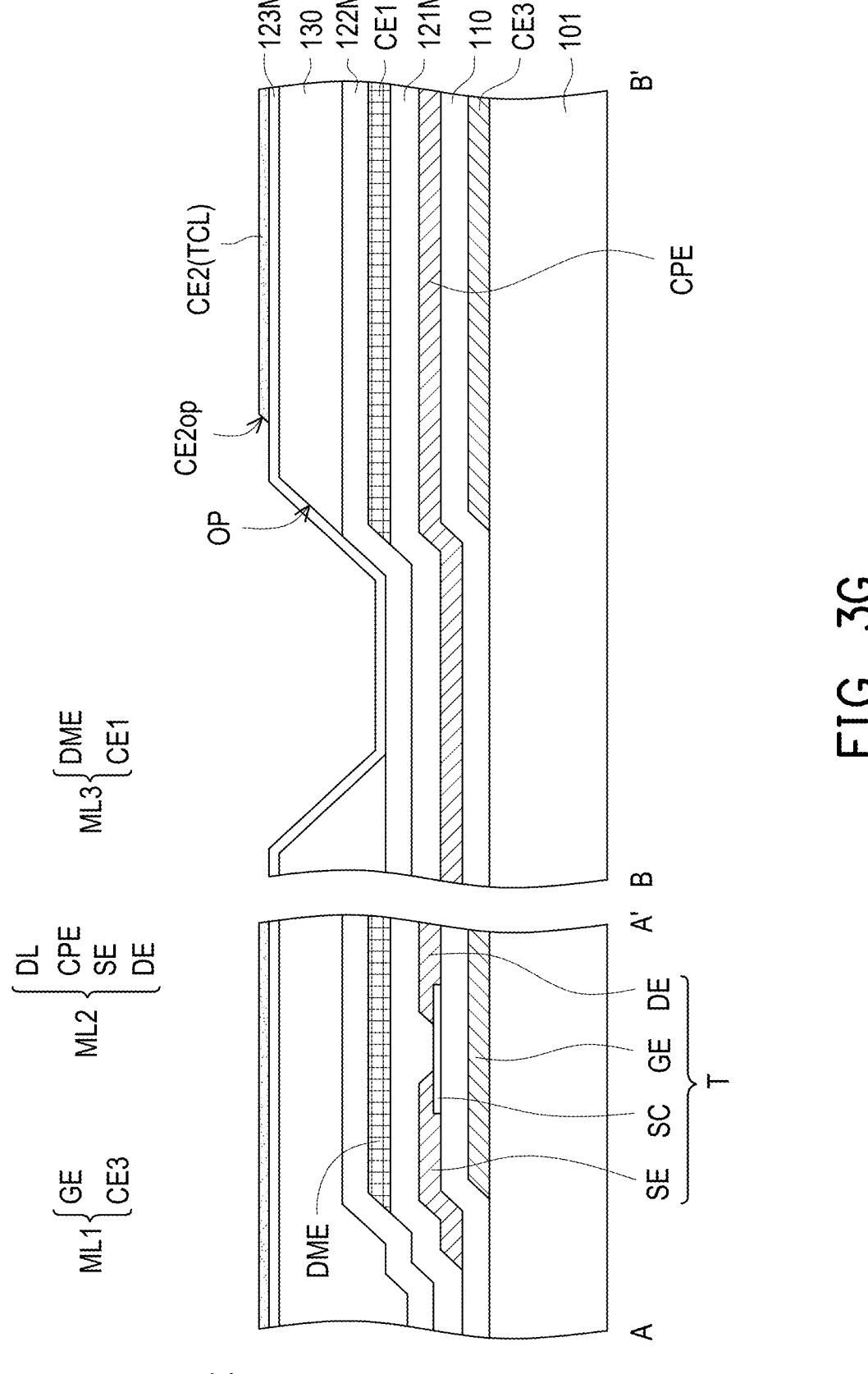

After the overcoat layer 130 is formed, a passivation material layer 123M and a transparent conductive layer TCL are sequentially formed on the overcoat layer 130, as shown in FIGS. 3G and 4F. FIG. 4F is a schematic top view of the transparent conductive layer TCL. In this embodiment, the transparent conductive layer TCL includes the second common electrode CE2. The second common electrode CE2 has an opening CE2op. The opening CE2op overlaps the opening OP of the overcoat layer 130 and the capacitor electrode CPE in the direction Z, and the opening CE2op exposes a portion of the passivation material layer 123M. A material of the transparent conductive layer TCL may include metal oxides (such as indium tin oxide, indium zinc oxide, aluminum tin oxide, aluminum zinc oxide, other suitable oxides, or a stacked layer of at least two of the above), but the disclosure is not limited thereto.

Figure 3H:
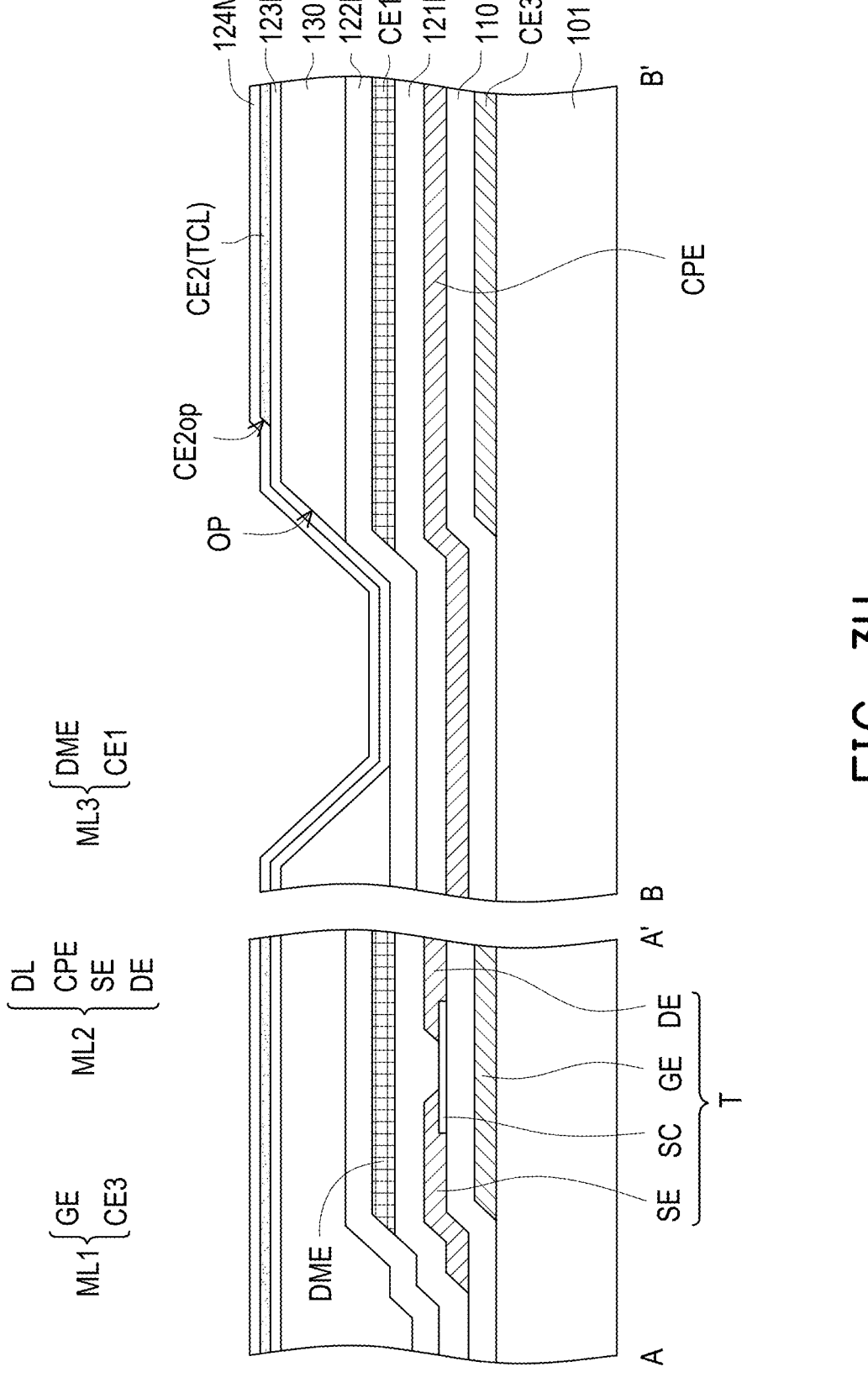
Figure 31:
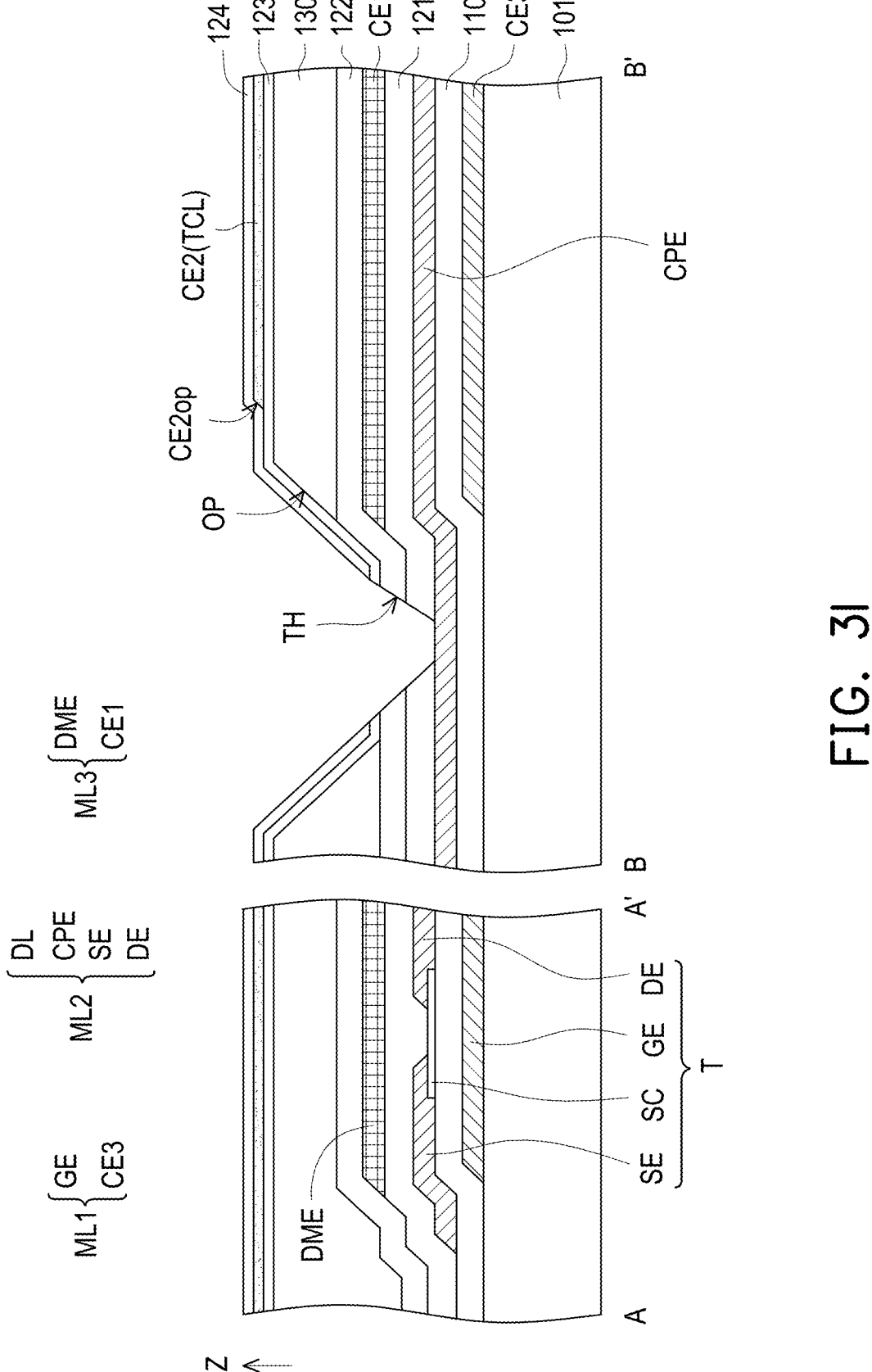

Next, a passivation material layer 124M (i.e., a second passivation material layer) is formed on the transparent conductive layer TCL, as shown in FIG. 3H. A material of the passivation material layer 124M may include, for example, silicon nitride, silicon oxide, or aluminum oxide, but the disclosure is not limited thereto.

Figure 4H:
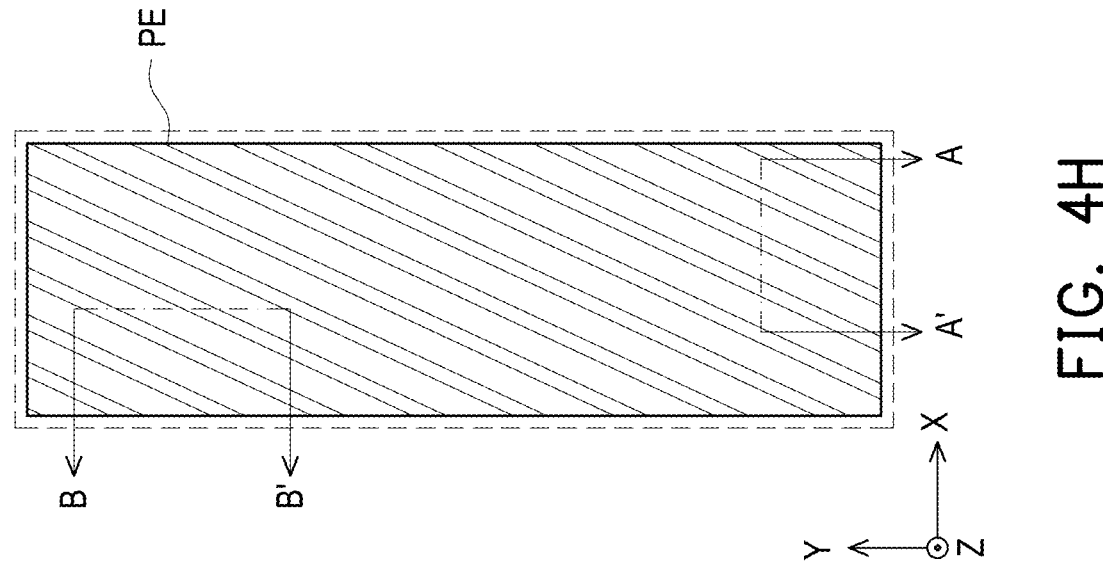
Figure 4G:

Referring to FIGS. 3H, 3I, and 4G, the passivation material layer 121M, the passivation material layer 122M, the passivation material layer 123M, and the passivation material layer 124M are etched to generate the passivation layer 121, the passivation layer 122, the passivation layer 123, and the passivation layer 124 that have a contact hole TH. FIG. 4G is a schematic top view of the contact hole TH of the passivation layer 121, the passivation layer 122, the passivation layer 123, and the passivation layer 124. The contact hole TH of the passivation layers overlaps the opening OP of the overcoat layer 130 and the opening CE2op of the second common electrode CE2 in the direction Z, and the contact hole TH expose a portion of the capacitor electrode CPE.

For example, the step of etching the passivation material layer 121M (i.e., the first passivation material layer), the passivation material layer 122M (i.e., a fourth passivation material layer), the passivation material layer 123M (i.e., a third passivation material layer), and the passivation material layer 124M (i.e. the second passivation material layer) to generate the contact hole TH is performed in the same photolithography etching process. Therefore, in addition to saving the number of process steps, the number of process masks may also be reduced. In this embodiment, the material of the overcoat layer 130 is the photosensitive material (such as the photoresist material), and a material of the second common electrode CE2 includes metal oxide. In order to avoid the passivation material layers being blocked by the second common electrode CE2 and the overcoat layer 130 during etching, a size of the contact hole TH is preferably less than a size of the opening CE2op of the second common electrode CE2 and a size of the opening OP of the overcoat layer 130, and the contact hole TH is completely located in the opening CE2op and the opening CE2op in a top-view direction (that is, a size of a projection of the contact hole TH on the substrate 101 is less than a size of a projection of the opening CE2op of the second common electrode CE2 on the substrate 101 and a size of a projection of the opening OP of the overcoat layer 130 on the substrate 101, and the projection of the contact hole TH on the substrate 101 is completely located in the projections of the opening CE2op and the opening OP on the substrate 101). However, the disclosure is not limited thereto.

In this embodiment, the overcoat layer 130 may also be called a flat layer to reduce unevenness of an upper surface of the passivation layer 122. That is, unevenness of an upper surface of the overcoat layer 130 is less than the unevenness of the upper surface of the passivation layer 122 (that is, flatness of the upper surface of the overcoat layer 130 is greater than flatness of the upper surface of the passivation layer 122), but the disclosure is not limited thereto. For example, the overcoat layer 130 may be an organic material and is formed on the passivation material layer 122M by a coating method (such as spin coating or slit coating), but the disclosure is not limited thereto. A film thickness of the overcoat layer 130 in the direction Z is greater than a film thickness of the passivation layer 122 in the direction Z. In addition, in this embodiment, the film thickness of the overcoat layer 130 in the direction Z is also greater than a film thickness of any one of the passivation layer 121, the passivation layer 123, the passivation layer 124, and the insulation layer 110 in the direction Z. For example, the film thickness of the overcoat layer 130 may range from 1 micron to 5 microns, but the disclosure is not limited thereto.

Referring to FIGS. 2 and 4H, after the contact hole TH of the passivation layer 121, the passivation layer 122, the passivation layer 123, and the passivation layer 124 is formed, the pixel electrode PE is formed on the passivation layer 124 (i.e., the second passivation layer). The pixel electrode PE extends into the opening OP of the overcoat layer 130 and is electrically connected to the capacitor electrode CPE through the contact hole TH. FIG. 4H is a schematic top view of the pixel electrode PE. In this embodiment, the pixel electrode PE is, for example, a reflective electrode. That is, in addition to receiving a grayscale signal transmitted by the data line DL, the pixel electrode PE may also be used as a reflective layer to reflect ambient light or reflect light from a front light module disposed on a light emitting side of the display panel 10. Therefore, the pixel electrode PE in this embodiment may define a reflection area RA of the pixel structure PX. That is to say, the display panel 10 in this embodiment may be a reflective display panel, but the disclosure is not limited thereto. According to other embodiments, the display panel may also be a transflective display panel. A material of the pixel electrode PE in this embodiment may include metals, alloys, nitrides of metal materials, oxides of the metal materials, oxynitrides of the metal materials, other suitable materials, or a stacked layer of the metal materials and other conductive materials.

Next, an assembly process is performed on the substrate 101 and the substrate 102. The liquid crystal layer LCL is disposed between the substrate 101 and the substrate 102, as shown in FIG. 2. At this point, the fabrication of the display panel 10 in this embodiment is completed.

Referring to FIGS. 2, 5A, 5B, and 5C, it is particularly noted that since the second common electrode CE2 is disposed on the side of the overcoat layer 130 close to the pixel electrode PE, a distance between the second common electrode CE2 and a signal line (such as the data line DL or the scan line GL) is increased, so that the capacitive coupling effect between the second common electrode CE2 and the signal line (such as the data line DL or the scan line GL) may be effectively reduced. Therefore, a range of configuration of the second common electrode CE2 may be further expanded. For example, as shown in FIGS. 1, 4A, 4C, and 4F, the second common electrode CE2 may overlap and cover the scan line GL and the data line DL electrically connected to the pixel structure PX in the direction Z. In this embodiment, an overlapping area (as shown in FIG. 5A) of the second common electrode CE2 and the pixel electrode PE along the direction Z may be greater than an overlapping area (as shown in FIG. 5B) of the first common electrode CE1 and the capacitor electrode CPE along the direction Z and an overlapping area (as shown in FIG. 5C) of the third common electrode CE3 and the capacitor electrode CPE along the direction Z.

That is to say, by increasing the overlapping area of the second common electrode CE2 and the pixel electrode PE, the capacitance value of second storage capacitor C2 may be greatly increased, thereby increasing the overall storage capacitance of the pixel structure PX. From another point of view, the second common electrode CE2 may further overlap and cover one of the data lines DL along the direction Z, and the second common electrodes CE2 of any two adjacent pixel structures PX are connected to each other. However, the disclosure is not limited thereto.

Some other embodiments are provided below to describe the invention in detail, where the same reference numerals denote the same or like components, and descriptions of the same technical contents are omitted. The aforementioned embodiment may be referred for descriptions of the omitted parts, and detailed descriptions thereof are not repeated in the following embodiment.

Figure 6:
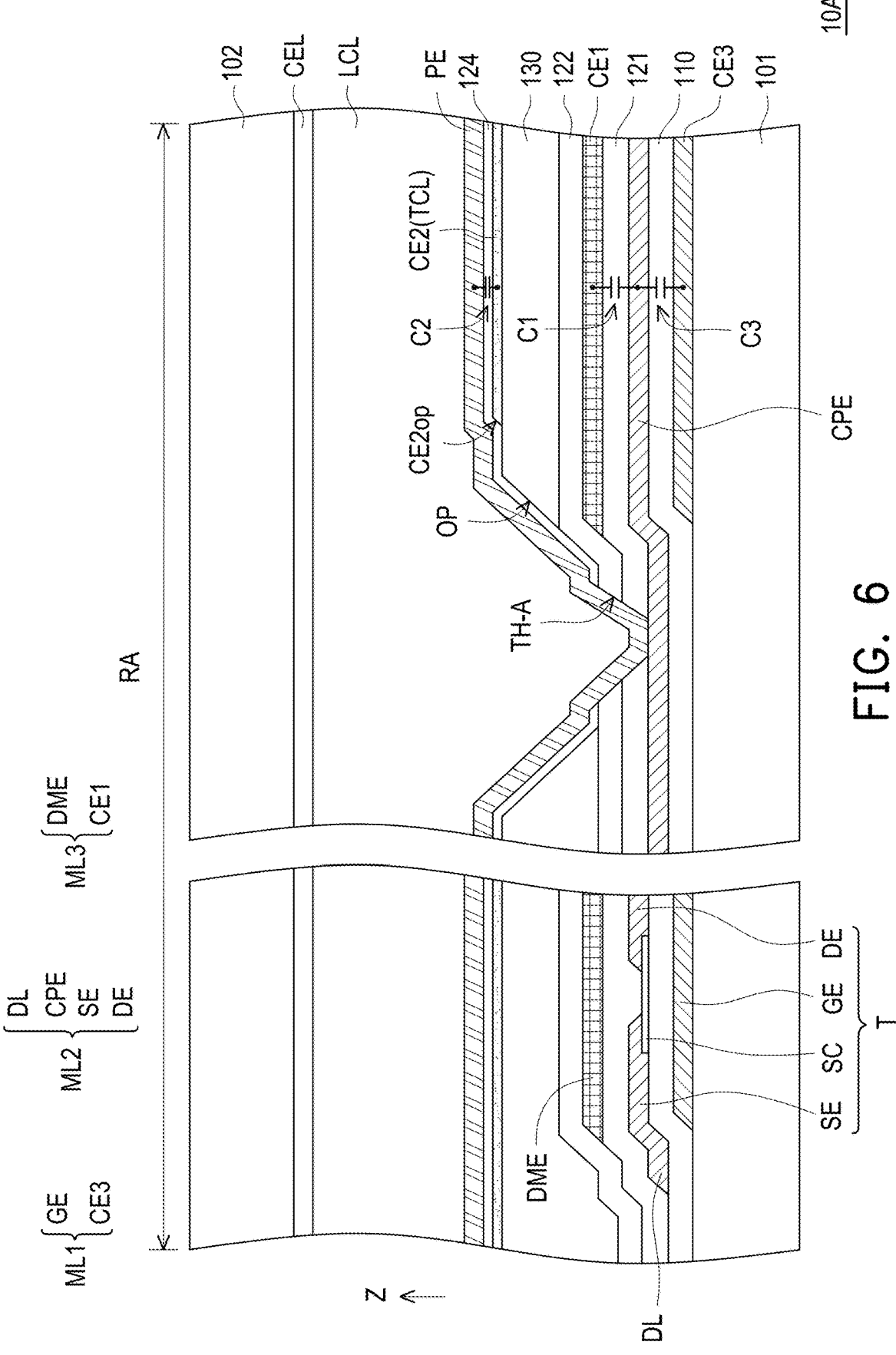
FIG. 6 is a schematic cross-sectional view of a display panel according to the second embodiment of the disclosure.

FIG. 6 is a schematic cross-sectional view of a display panel according to the second embodiment of the disclosure. Referring to FIG. 6, a difference between a display panel 10A in this embodiment and the display panel 10 in FIG. 2 is that the second common electrode CE2 of the display panel 10A in this embodiment may be directly disposed on the overcoat layer 130. That is, the passivation layer 123 as shown in FIG. 2 is not disposed between the second common electrode CE2 and the overcoat layer 130.

In this embodiment, the passivation layer 121, the passivation layer 122, and the passivation layer 124 have a contact hole TH-A. Similar to the contact hole TH of the passivation layer 121, the passivation layer 122, the passivation layer 123, and the passivation layer 124 in the first embodiment, the contact hole TH-A in this embodiment overlaps the opening OP of the overcoat layer 130 and the opening CE2op of the second common electrode CE2 in the direction Z, and the contact hole TH-A exposes the portion of the capacitor electrode CPE.

A method of fabricating the display panel 10A in this embodiment is similar to that of the first embodiment and may be referred to FIGS. 3A to 3G and 3I in the first embodiment. For example, the passivation material layer 121M (i.e., the first passivation material layer), the passivation material layer 122M (i.e., the fourth passivation material layer), and the passivation material layer 124M (i.e., the second passivation material layer) may be etched in the same photolithography etching process to generate the contact hole TH-A. Therefore, in addition to saving the number of process steps, the number of process masks may also be reduced.

Figure 7:
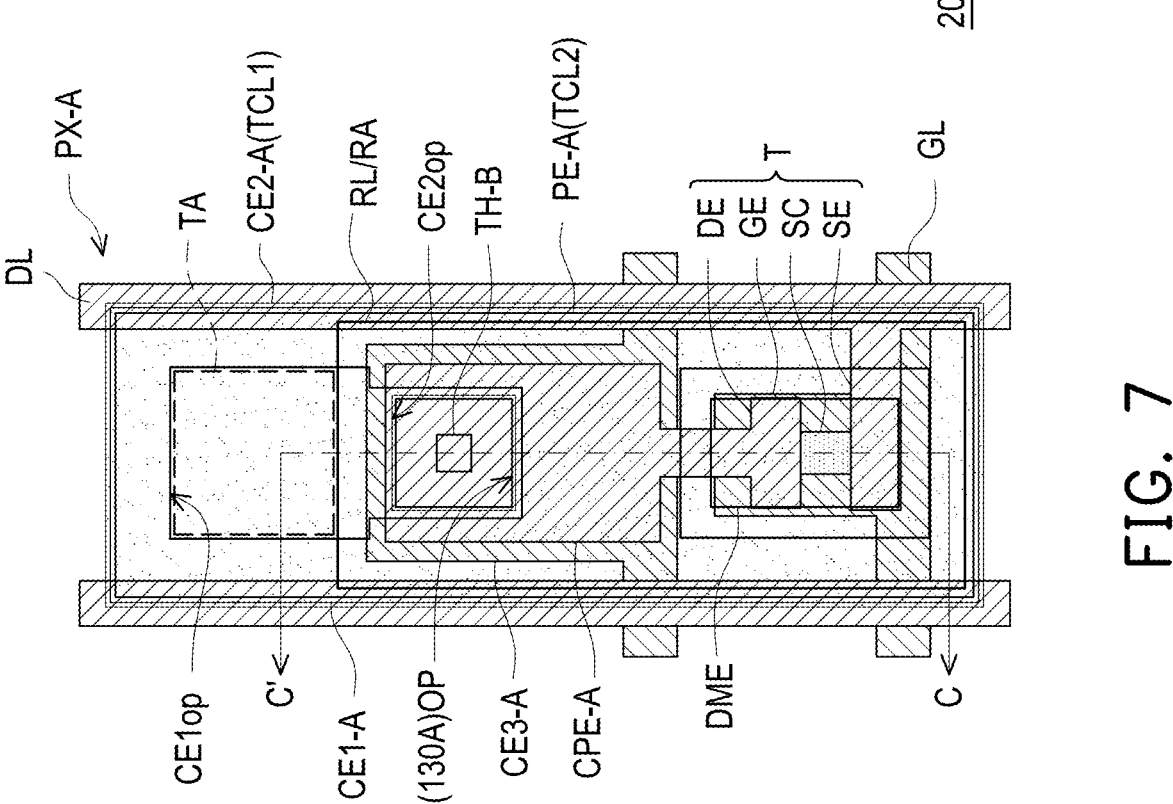
FIG. 7 is a schematic top view of a display panel according to the third embodiment of the disclosure.
Figure 8:
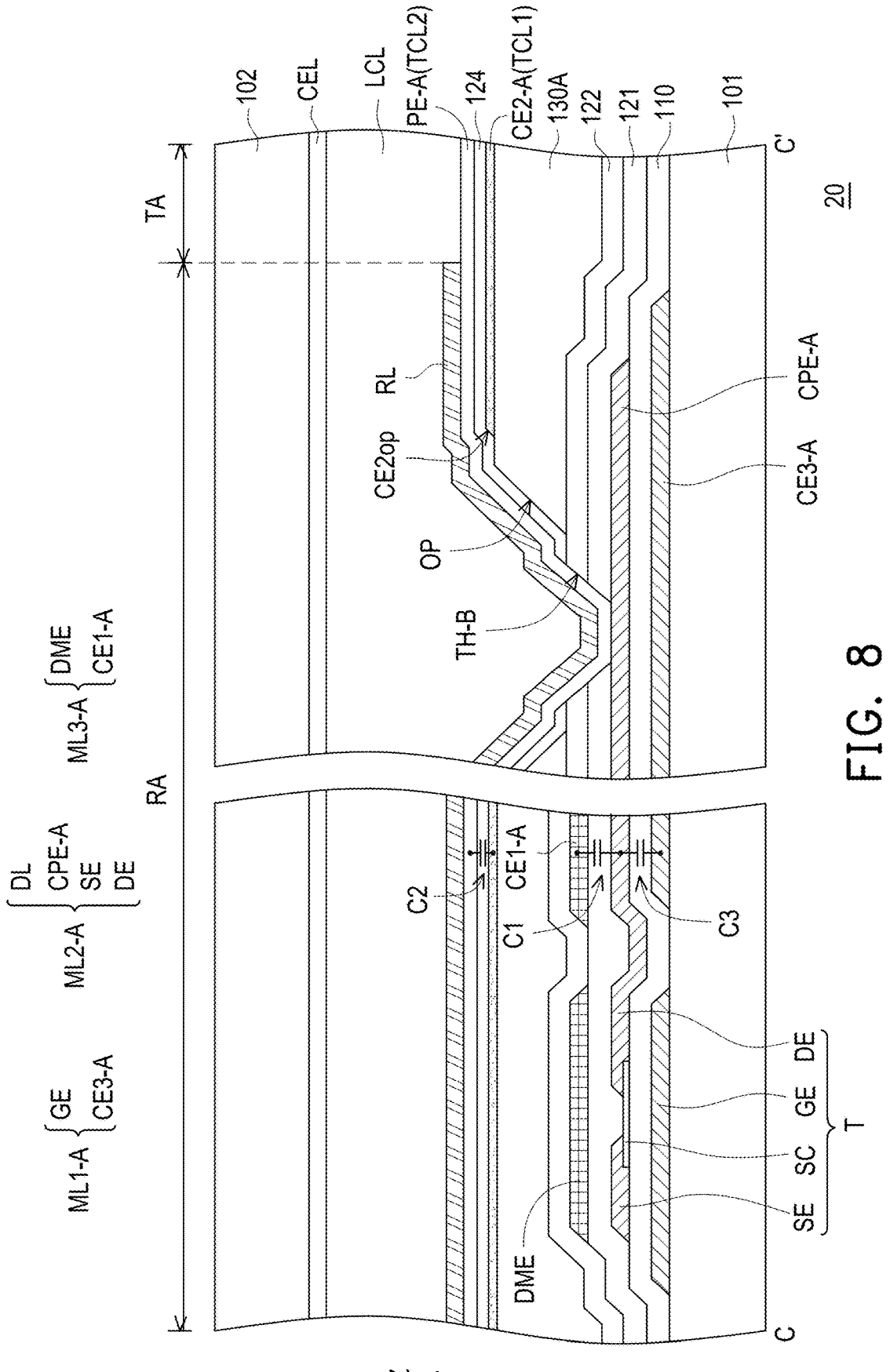
FIG. 8 is a schematic cross-sectional view of the display panel in FIG. 7.

FIG. 7 is a schematic top view of a display panel according to the third embodiment of the disclosure. FIG. 8 is a schematic cross-sectional view of the display panel in FIG. 7. FIGS. 9A to 9I are schematic top views of each of film layers of the display panel in FIG. 7. FIG. 8 corresponds to a section line C-C' in FIG. 7. For the sake of clarity, in FIG. 7, the substrate 101, the substrate 102, the common electrode layer CEL, and the liquid crystal layer LCL in FIG. 8 are omitted.

Referring to FIGS. 7 and 8, different from the display panel 10 in FIGS. 1 and 2, which is the reflective display panel, in this embodiment, a display panel 20 may be a transflective display panel. That is, a pixel structure PX-A in this embodiment may have both a transmission area TA and the reflection area RA.

Figures 9A, 9B, 9C:
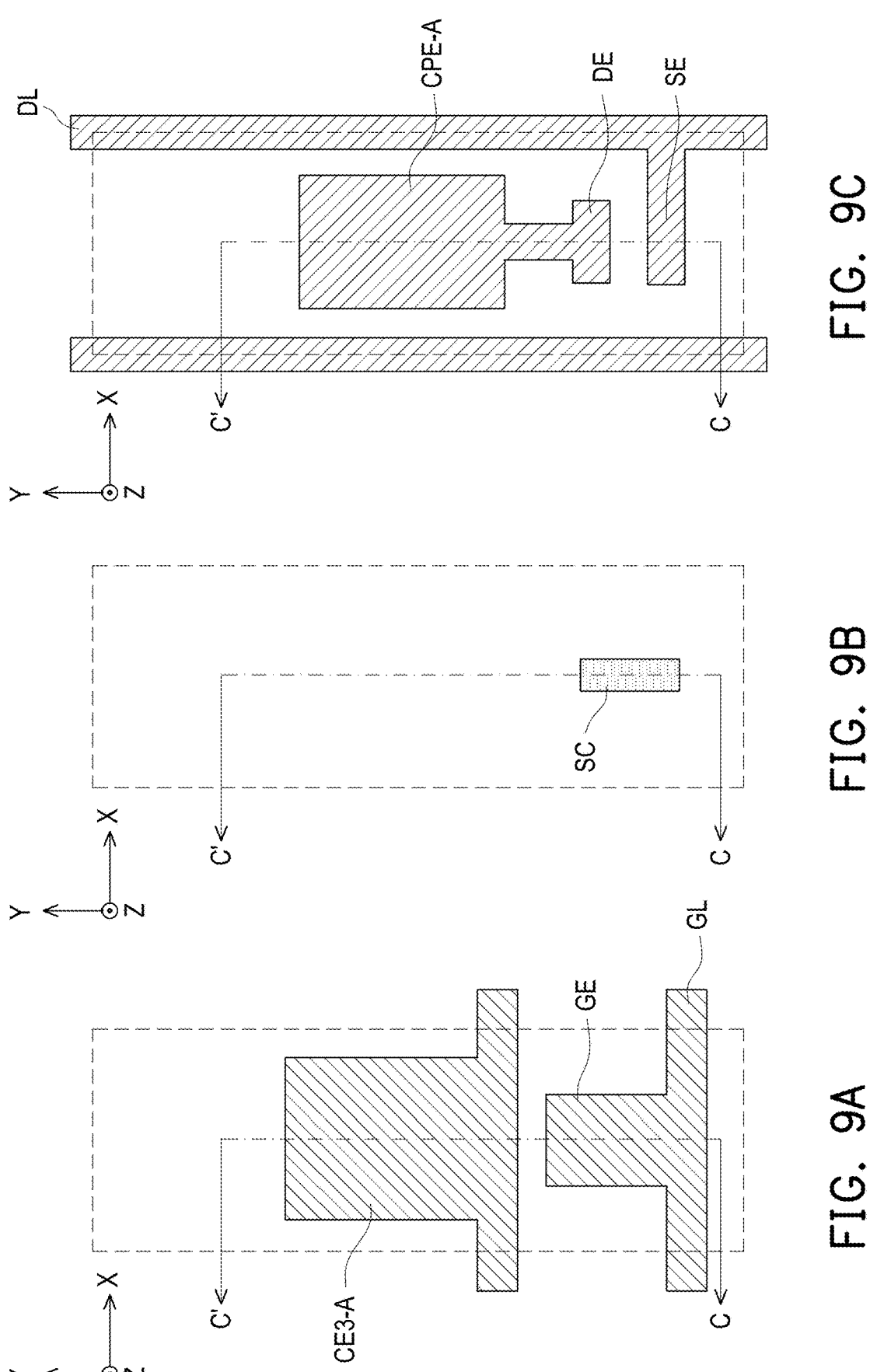
FIGS. 9A to 9I are schematic top views of each of film layers of the display panel in FIG. 7.
Figures 9D, 9E, 9F:
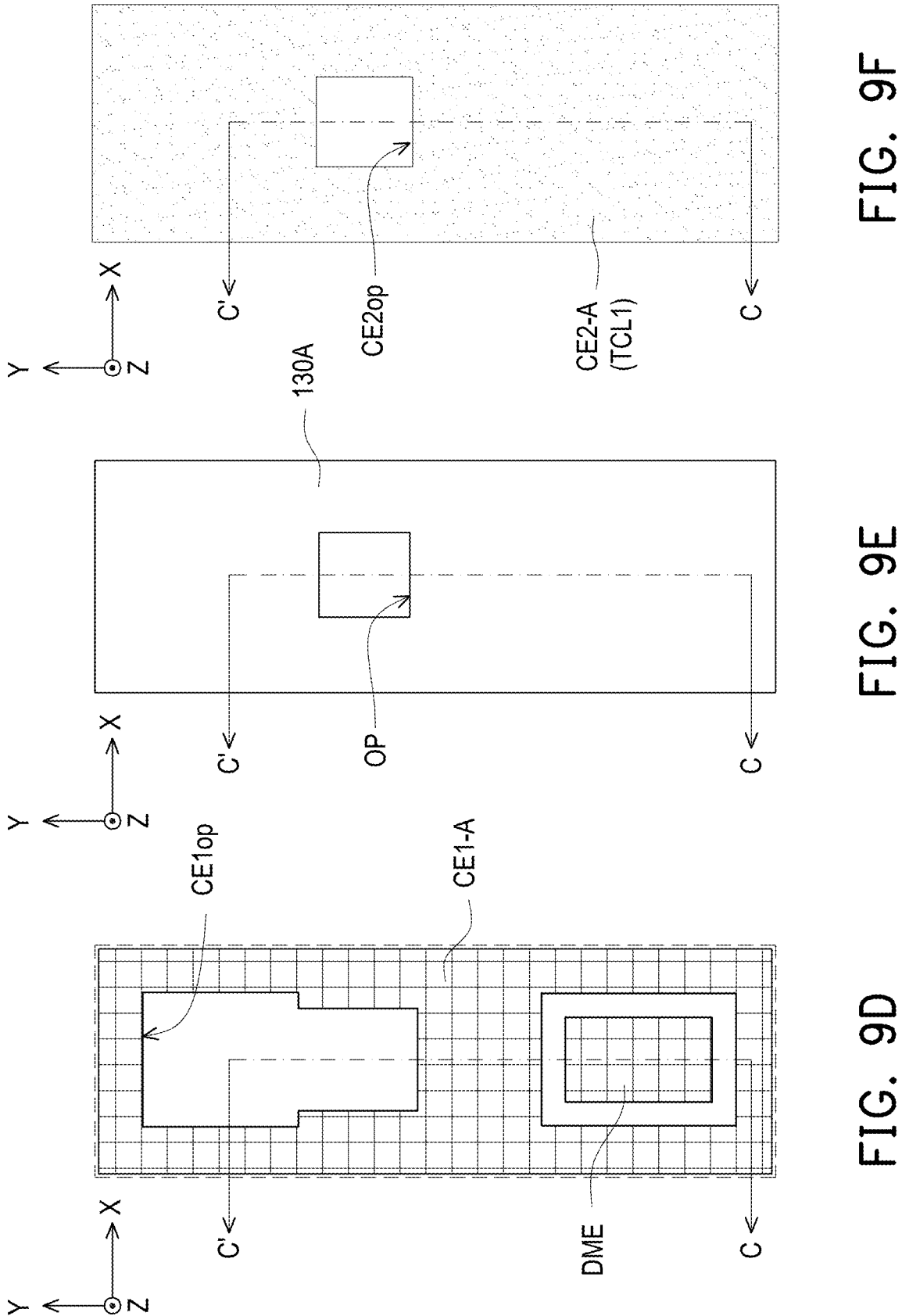
Figures 9G, 9H, 9I:
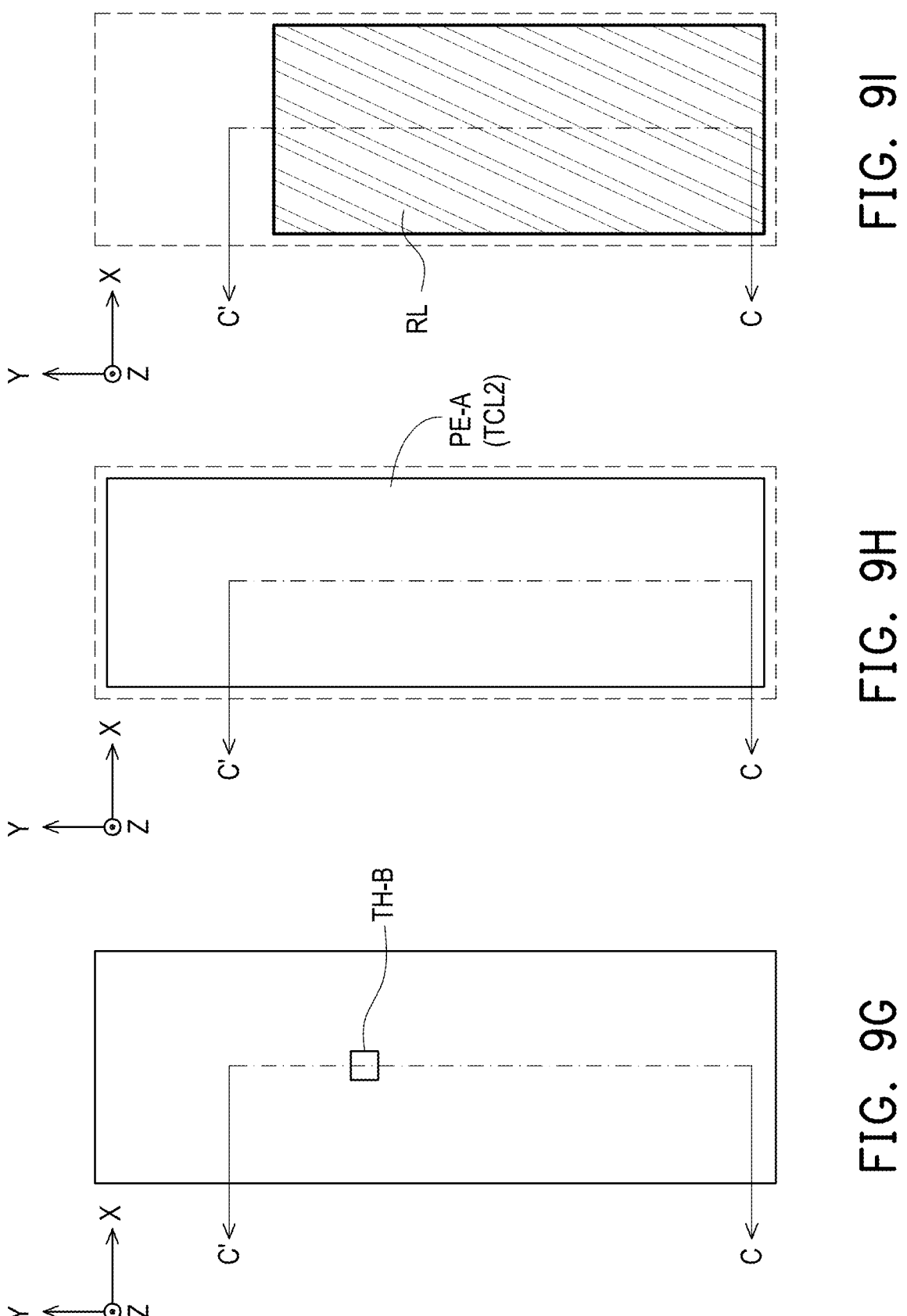

In detail, the pixel structure PX-A may further include a reflection layer RL defining the reflection area RA. The reflection layer RL is directly disposed on a pixel electrode PE-A, and the reflection layer RL and the pixel electrode PE-A are electrically connected to each other. FIGS. 9H and 9I are schematic top views of the pixel electrode PE-A and the reflection layer RL respectively. It is particularly noted that in this embodiment, the reflection layer RL overlaps and covers a portion of the pixel electrode PE-A along the direction Z, and a portion of the pixel electrode PE-A that is not covered by the reflection layer RL defines the transmission area TA of the pixel electrode PE-A. That is to say, in this embodiment, the pixel electrode PE-A of the pixel structure PX-A is a light-transmitting electrode, and a material of the light-transmitting electrode includes a transparent conductive material. For example, a material of the pixel electrode PE-A may include metal oxides, such as indium tin oxide, indium zinc oxide, aluminum tin oxide, aluminum zinc oxide, other suitable oxides, or a stacked layer of at least two of the above, but the disclosure us not limited thereto. The reflection layer RL may be used to reflect the ambient light or reflect the light from a front light module disposed on a light emitting side of the display panel 20, while the light from a backlight module disposed on a side of the substrate 101 of the display panel 20 away from the liquid crystal layer LCL may pass through the portion of the pixel electrode PE-A that is not covered by the reflection layer RL.

In this embodiment, steps of forming the pixel structure PX-A may include the following. A first metal layer ML1-A (as shown in FIG. 9A), the insulation layer 110, the semiconductor pattern SC (as shown in FIG. 9B), a second metal layer ML2-A (shown in FIG. 9C), a third metal layer ML3-A (shown in FIG. 9D), an overcoat layer 130A (shown in FIG. 9E), a first transparent conductive layer TCL1 (shown in FIG. 9F), a second transparent conductive layer TCL2 (shown in FIG. 9H), and the reflection layer RL (shown in FIG. 9I) are sequentially formed on the substrate 101. The first metal layer ML1-A includes the scan line GL, the gate GE, and a third common electrode CE3-A. The second metal layer ML2-A includes the data line DL, the source SE, the drain DE, and a capacitor electrode CPE-A. The third metal layer ML3-A includes the dummy electrode DME and a first common electrode CE1-A. The first transparent conductive layer TCL1 includes a second common electrode CE2-A. The second transparent conductive layer TCL2 includes the pixel electrode PE-A.

Similar to the display panel 10 in FIG. 2, in this embodiment, the passivation layer 121 is disposed between the second metal layer ML2-A and the third metal layer ML3-A, the passivation layer 122 is disposed between the third metal layer ML3-A and the overcoat layer 130A, and the passivation layer 124 is disposed between the first transparent conductive layer TCL1 and the pixel electrode PE-A. A difference is that in the display panel 20 in this embodiment, the second common electrode CE2-A may be directly disposed on the overcoat layer 130A. That is, the passivation layer 123 as shown in FIG. 2 is not disposed between the second common electrode CE2-A and the overcoat layer 130A, but the disclosure is not limited thereto. In other embodiments, the passivation layer 123 as shown in FIG. 2 may be disposed between the second common electrode CE2-A and the overcoat layer 130A.

In this embodiment, the passivation layer 121, the passivation layer 122, and the passivation layer 124 have a contact hole TH-B. Similar to the contact hole TH-A of the passivation layer 121, the passivation layer 122, and the passivation layer 124 in the second embodiment, the contact hole TH-B in this embodiment overlaps the opening OP of the overcoat layer 130A and the opening CE2op of the second common electrode CE2-A in the direction Z, and the contact hole TH-B exposes a portion of the capacitor electrode CPE-A.

Methods of fabricating the first metal layer ML1-A, the insulation layer 110, the semiconductor pattern SC, the second metal layer ML2-A, the third metal layer ML3-A, the overcoat layer 130A, the first transparent conductive layer TCL1, and the passivation layers 121, 122, and 124 of the display panel 20 in this embodiment are respectively similar to methods of fabricating the first metal layer ML1, the insulation layer 110, the semiconductor pattern SC, the second metal layer ML2, the third metal layer ML3, the overcoat layer 130, the transparent conductive layer TCL, and the passivation layers 121, 122, and 124 in the first embodiment, and reference may be made to FIGS. 3A to 3G and 3I in the first embodiment. For example, the passivation material layer 121M (i.e., the first passivation material layer), the passivation material layer 122M (i.e., the fourth passivation material layer), and the passivation material layer 124M (i.e., the second passivation material layer) may be etched in the photolithography etching process to generate the contact hole TH-B. Therefore, in addition to saving the number of process steps, the number of process masks may also be reduced.

After the contact hole TH-B of the passivation layer 121, the passivation layer 122, and the passivation layer 124 are formed, the second transparent conductive layer TCL2 is formed on the passivation layer 124. The second transparent conductive layer TCL2 includes the pixel electrode PE-A, and the pixel electrode PE-A is electrically connected to the capacitor electrode CPE-A through the opening OP of the overcoat layer 130A and the contact hole TH-B (as shown in FIG. 9G) formed by the passivation layer 121, the passivation layer 122, and the passivation layer 123 in the same photolithography etching process.

After the second transparent conductive layer TCL2 is formed, the reflection layer RL is formed on the second transparent conductive layer TCL2. The reflection layer RL is located in the reflection area RA of the pixel structure PX-A. A portion of the pixel electrode PE-A is overlapped and covered by the reflection layer RL along the direction Z, and another portion of the pixel electrode PE-A that is not covered by the reflection layer RL is located in the transmission area TA of the pixel structure PX-A.

In this embodiment, the first common electrode CE1-A overlaps the capacitor electrode CPE-A and the data line DL of the second metal layer ML2-A and the scan line GL of the first metal layer ML1-A. Different from the third metal layer ML3 in FIGS. 2 and 4D, the third metal layer ML3-A (or the first common electrode CE1-A) in this embodiment has a hollowed portion CE1op, and the hollowed portion CE1op overlaps the transmission area TA in FIG. 7. In particular, the first common electrode CE1-A overlaps the second common electrode CE2-A and covers the data line DL and scan line GL, which may shield interference of signals of the data line DL and the scan line GL on the pixel electrode PE-A.

Since a configuration relationship between the first common electrode CE1-A, the second common electrode CE2-A, the third common electrode CE3-A, the capacitor electrode CPE-A, and the pixel electrode PE-A in this embodiment is similar to that of the first common electrode CE1, the second common electrode CE2, the third common electrode CE3, the capacitor electrode CPE, and the pixel electrode PE in FIG. 1, relevant paragraphs of the foregoing embodiments may be referred for detailed descriptions, and the same details will not be repeated in the following. Specifically, as shown in FIG. 8, the third common electrode CE3-A, the insulation layer 110, the capacitor electrode CPE-A, the passivation layer 121, the first common electrode CE1-A, the passivation layer 122, the overcoat layer 130A, the second common electrode CE2-A, the passivation layer 124, the pixel electrode PE-A, and the reflection layer RL are sequentially disposed along the direction Z.

In particular, as shown in FIG. 8, since the second common electrode CE2-A is disposed on a side of the overcoat layer 130A close to the pixel electrode PE-A, a distance between the second common electrode CE2-A and the signal line (such as the data line DL or the scan line GL) is increased, so that capacitive coupling effect between the second common electrode CE2-A and the signal line (such as the data line DL or the scan line GL) may be effectively reduced. Therefore, a range of configuration of the second common electrode CE2-A may be further expanded. For example, as shown in FIGS. 7, 9A, 9C, and 9F, the second common electrode CE2-A may overlap and cover the scan line GL and the data line DL electrically connected to the pixel structure PX-A in the direction Z. In this embodiment, an overlapping area (as shown in FIGS. 9F and 9H) of the second common electrode CE2-A and the pixel electrode PE-A along the direction Z may be greater than an overlapping area (shown in FIGS. 9C and 9D) of the first common electrode CE1-A and the capacitor electrode CPE-A in the direction Z and an overlapping area (shown in FIGS. 9A and 9C) of the third common electrode CE3-A and the capacitor electrode CPE-A along the direction Z.

That is to say, by increasing the overlapping area of the second common electrode CE2-A and the pixel electrode PE-A, the capacitance value of the second storage capacitor C2 may be greatly increased, thereby increasing the overall storage capacitance of the pixel structure PX-A. For example, in a comparative embodiment where the second common electrode CE2-A and the passivation layer 124 are not disposed, the storage capacitance of the pixel structure may be 137.54 femtofarad, while the storage capacitance of the pixel structure PX-A in this embodiment may be 873.67 femtofarad. Therefore, compared to the comparative embodiment, the storage capacitance of the pixel structure PX-A in this embodiment may be increased by more than four times.

Based on the above, in the display panel and the method of fabricating the same according to an embodiment of the disclosure, one common electrode is disposed between the capacitor electrode electrically connected to the active device and the overcoat layer, and another common electrode is disposed between the pixel electrode electrically connected to the capacitor electrode and the overcoat layer. Since the side of the overcoat layer closer to the pixel electrode is also provided with the common electrode, in addition to shortening the distance between the pixel electrode and the common electrode, the overlapping range of the common electrode and the pixel electrode may also be larger, thereby increasing the storage capacitor capacity of the pixel structure.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. A display panel, comprising:
a substrate;
a plurality of scan lines and a plurality of data lines disposed on the substrate, wherein the scan lines intersect with the data lines; and
a plurality of pixel structures disposed on the substrate and electrically connected to the data lines and the scan lines, wherein each of the pixel structures comprises:
an active device having a gate, a source, and a drain, wherein the gate is electrically connected to one of the scan lines, and the source is electrically connected to one of the data lines;
a pixel electrode electrically connected to the drain of the active device;
a capacitor electrode extending from the drain and electrically connected to the pixel electrode;
an overcoat layer disposed between the pixel electrode and the capacitor electrode, wherein the overcoat layer has an opening overlapping the capacitor electrode;
a first common electrode overlapping the capacitor electrode and located between the overcoat layer and the capacitor electrode;
a second common electrode overlapping the pixel electrode and located between the overcoat layer and the pixel electrode;

a first passivation layer disposed between the capacitor electrode and the first common electrode; and a second passivation layer disposed between the second common electrode and the pixel electrode, wherein the second passivation layer extends into the opening of the overcoat layer.

2. The display panel according to claim 1, wherein the first common electrode is electrically coupled to the capacitor electrode to form a first storage capacitor, and the second common electrode is electrically coupled to the pixel electrode to form a second storage capacitor.

3. The display panel according to claim 2, wherein an overlapping area of the second common electrode and the pixel electrode is greater than an overlapping area of the first common electrode and the capacitor electrode.

4. The display panel according to claim 3, wherein a capacitance value of the second storage capacitor is greater than a capacitance value of the first storage capacitor.

5. The display panel according to claim 2, wherein each of the pixel structures further comprises a third common electrode overlapping the capacitor electrode and located between the capacitor electrode and the substrate, and the third common electrode is electrically coupled to the capacitor electrode to form a third storage capacitor.

6. The display panel according to claim 1, wherein the display panel has a reflection area, the pixel electrode is located in the reflection area, and a material of the pixel electrode comprises metal.

7. The display panel according to claim 1, wherein the display panel has a reflection area and a transmission area, the pixel electrode is located in the reflection area and the transmission area, a material of the pixel electrode comprises a transparent conductive material, each of the pixel structures further comprises a reflection layer electrically connected to the pixel electrode, the reflection layer is located in the reflection area, the reflection layer overlaps and covers a portion of the pixel electrode, and a portion of the pixel electrode not covered by the reflection layer is located in the transmission area.

8. A method of fabricating a display panel, comprising:

forming a metal layer on a substrate, wherein the metal layer comprises a capacitor electrode;

forming a first passivation material layer on the metal layer;

forming another metal layer on the first passivation material layer, wherein the another metal layer comprises a first common electrode, and the first common electrode overlaps the capacitor electrode;

forming an overcoat layer on the first passivation material layer and the another metal layer, wherein the overcoat layer has an opening overlapping the capacitor electrode;

forming a transparent conductive layer on the overcoat layer, wherein the transparent conductive layer comprises a second common electrode;

forming a second passivation material layer on the transparent conductive layer, wherein the second passivation material layer extends into the opening and covers the first passivation material layer;

performing an etching process on the first passivation material layer and the second passivation material layer to generate a first passivation layer and a second passivation layer exposing a portion of the capacitor electrode; and forming a pixel electrode on the second passivation layer, wherein the pixel electrode extends into the opening of the overcoat layer to be electrically connected to the capacitor electrode, and the pixel electrode overlaps the second common electrode.

9. The method of fabricating the display panel according to claim 8, wherein the metal layer is a second metal layer, and the another metal layer is a third metal layer, wherein before the second metal layer is formed, the method further comprises:

forming a first metal layer on the substrate, wherein the first metal layer comprises a third common electrode; and forming an insulation layer on the first metal layer, wherein after the second metal layer is formed, the second metal layer is located on the insulation layer.

10. The method of fabricating the display panel according to claim 8, wherein a material of the overcoat layer comprises a photosensitive material, and a step of forming the overcoat layer comprises:

forming an overcoat material layer on the first passivation layer and the another metal layer; and performing an exposure process and a development process on the overcoat material layer to remove a portion of the overcoat material layer to form the opening.

11. The method of fabricating the display panel according to claim 8, wherein the first passivation material layer and the second passivation material layer are etched in a same photolithography etching process.

12. The method of fabricating the display panel according to claim 8, further comprising:

forming a reflection layer on the pixel electrode, wherein the reflection layer is electrically connected to the pixel electrode.

* * * * *